United States Patent
Vadapalli et al.

(12)

(10) Patent No.: US 11,626,960 B2
(45) Date of Patent: Apr. 11, 2023

(54) ENHANCED TECHNIQUES FOR TRANSMITTING INDICATIONS OF CHANNEL QUALITIES IN MULTI-SUBSCRIBER IDENTIFICATION MODULE DEVICES

(71) Applicant: QUALCOMM Incorporated, San Diego, CA (US)

(72) Inventors: Syam Pavan Vadapalli, Visakhapatnam (IN); AnkammaRao Ravuvari, Hyderabad (IN); Roop Sagar Inakollu, Nellore (IN)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/214,676

(22) Filed: Mar. 26, 2021

(65) Prior Publication Data
US 2022/0311586 A1 Sep. 29, 2022

(51) Int. Cl.
*H04L 5/00* (2006.01)
*H04W 72/0446* (2023.01)
*H04W 72/12* (2023.01)
*H04W 74/02* (2009.01)

(52) U.S. Cl.
CPC ....... *H04L 5/0057* (2013.01); *H04W 72/0446* (2013.01); *H04W 72/1284* (2013.01); *H04W 74/02* (2013.01)

(58) Field of Classification Search
CPC ......... H04W 72/0446; H04W 72/1284; H04W 74/02; H04L 5/0057
See application file for complete search history.

(56) References Cited

U.S. PATENT DOCUMENTS 10,623,946 B1 * 4/2020 Kumar ................ H04W 76/16
2020/0145062 A1 * 5/2020 Jung ................... H04W 48/20

FOREIGN PATENT DOCUMENTS

WO    WO-2020019125 A1 * 1/2020

OTHER PUBLICATIONS

Mitsubishi R1-1710409: Views on SRS designs 3GPP TSG RAN WG1 Meeting Ad hoc Jun. 2017 (Year: 2017).*

(Continued)

*Primary Examiner* — Rina C Pancholi
(74) *Attorney, Agent, or Firm* — Loza & Loza, LLP

(57) ABSTRACT

Aspects relate to mechanisms for wireless communication device to transmit indications of channel qualities for uplink and downlink transmission involving multi-subscriber identification module (MSIM) devices. A user equipment (UE) having a first subscription and a second subscription is provided. The UE identifies one or more base-band resource outage periods associated with the first subscription based on a utilization of at least partially shared base-band resources by the second subscription. The UE also transmits one or more medium access control (MAC) control elements (MAC-CEs) to a base station requesting a modification of one or more data transmission timing parameters of one or more data elements associated with the first subscription based on the one or more base-band resource outage periods associated with the first subscription.

24 Claims, 18 Drawing Sheets

(56) References Cited

OTHER PUBLICATIONS

Huawei, et al., "Summary of Remaining Details of SRS Design", 3GPP TSG RAN WG1 Ad Hoc Meeting, R1-1800090, 3rd Generation Partnership Project (3GPP), Mobile Competence Centre, 650, Route Des Lucioles, F-06921, Sophia-Antipolis Cedex, France, vol. RAN WG1, no. Vancouver, Canada, Jan. 22, 2018-Jan. 26, 2018, Jan. 12, 2018 (Jan. 12, 2018), XP051384453, 12 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018] Section 3.1, Sections 1-4.
International Search Report and Written Opinion—PCT/US2022/016817—ISA/EPO—dated Jun. 22, 2022.
Mitsubishi Electric: "Views on SRS Designs", 3GPP Draft, 3GPP TSG RAN WG1 Meeting Ad Hoc, R1-1710409-SRS_MITBS_K, 3rd Generation Partnership Project (3GPP), Mobile Competence Centre, 650, Route Des Lucioles, F-06921, Sophia-Antipolis Cedex, France, vol. RAN WG1, no. Qingdao, P.R. China, Jun. 27, 2017-Jun. 30, 2017, Jun. 16, 2017 (Jun. 16, 2017), XP051304293, 8 Pages, Retrieved from the Internet: URL: http://www.3gpp.org/ftp/tsg_ran/WG1_RL1/TSGR1_AH/NR_AH_1706/Docs/ [retrieved on Jun. 16, 2017] Sections 2.1, 2.3, 2.4.

* cited by examiner

ENHANCED TECHNIQUES FOR TRANSMITTING INDICATIONS OF CHANNEL QUALITIES IN MULTI-SUBSCRIBER IDENTIFICATION MODULE DEVICES

TECHNICAL FIELD

The technology discussed below relates generally to wireless communication networks, and more particularly, to techniques for transmitting indications of channel qualities for uplink and downlink transmission involving multi-subscriber identification module (MSIM) devices.

BACKGROUND

Wireless communication between devices may be facilitated by various network configurations. In one configuration, a cellular network may enable wireless communication devices (e.g., user equipment (UEs)) to communicate with one another through signaling with a nearby base station or cell. In some aspects, a UE may be configured for SRS-config through a radio resource control (RRC) message. An information element (IE) of within the SRS-config may provide information for sounding reference signal (SRS) transmission including antenna ports, frequency, and time domain resource to transmit an SRS. SRSs may be transmitted by the UE to a base station to assist the network with measuring an uplink propagation channel. In some aspects, uplink signal-to-interference-and-noise ratio (SINR) may be measured from the SRS and may be an input to link adaption.

In some aspects, a UE may be configured for CSI-ReportConfig through an RRC message. An information element (IE) of within the CSI-ReportConfig may provide the UE within information concerning channel state information (CSI) quantities (e.g., channel quality information (CQI), precoding matrix indication (PMI), rank indication (RI), or the like). A ResourcesForChannelMeasurement IE include in the CSI-ReportConfig may indicate to a UE about a choice of nzp-CSI-RS-ResourceSetList which may have information about CSI-RS-ResourceMapping which may provide information about an actual CSI-RS being transmitted in the downlink and may enable a UE to perform measurements and report back to the network through the base station CSI quantities.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method of wireless communication operable at a user equipment (UE) having a first subscription and a second subscription is provided. The method includes identifying one or more base-band resource outage periods associated with the first subscription based on a utilization of at least partially shared base-band resources by the second subscription. The method also includes transmitting one or more medium access control (MAC) control elements (MAC-CEs) to a base station requesting a modification of one or more data transmission timing parameters of one or more data elements associated with the first subscription based on the one or more base-band resource outage periods associated with the first subscription.

In some aspects, the one or more data elements may include at least a sounding reference signal (SRS) for an uplink. In some aspects, the one or more data transmission timing parameters may include at least an SRS-PeriodicityAndOffset value for avoiding a collision between the base-band resources utilized by the second subscription and the SRS for the uplink. In some aspects, the method may further include receiving one or more radio resource control (RRC) signals indicating that the one or more data transmission timing parameters of the one or more data elements are modified based on the modification of the one or more data transmission timing parameters requested in the one or more MAC-CEs. In some aspects, the method may further include transmitting the SRS on the uplink according to the modification of the one or more data transmission timing parameters requested in the one or more MAC-CEs.

In some aspects, identifying the one or more base-band resource outage periods associated with the first subscription based on the utilization of the base-band resources by the second subscription may include detecting a collision between the base-band resources utilized by the second subscription and the SRS on the uplink. In some aspects, the one or more data elements may include at least a channel state information (CSI) reference signal (CSI-RS) for a downlink. In some aspects, the one or more data transmission timing parameters may include at least an CSI-ReportPeriodiciAndOffset value for avoiding a collision between the base-band resources utilized by the second subscription and the CSI-RS for the downlink. In some aspects, the method may further include receiving one or more radio resource control (RRC) signals indicating that the one or more data transmission timing parameters of the one or more data elements are modified based on the modification of the one or more data transmission timing parameters requested in the one or more MAC-CEs. In some aspects, the method may further include receiving the CSI-RS on the downlink according to the modification of the one or more data transmission timing parameters requested in the one or more MAC-CEs. In some aspects, identifying the one or more base-band resource outage periods associated with the first subscription based on the utilization of the base-band resources by the second subscription may include detecting a collision between the base-band resources utilized by the second subscription and the CSI-RS on the downlink.

A method of wireless communication operable at a base station is provided. The method includes receiving one or more medium access control (MAC) control elements (MAC-CEs) from a user equipment (UE) requesting a modification of one or more data transmission timing parameters associated with a first subscription based on one or more base-band resource outage periods associated with the first subscription. The method also includes scheduling a transmission of one or more data elements between the UE and the base station based on the modification of the one or more data transmission timing parameters requested in the one or more MAC-CEs.

In some aspects, the one or more data elements may include at least a sounding reference signal (SRS) for an uplink. In some aspects, the one or more data transmission timing parameters may include at least an SRS-PeriodicityAndOffset value for avoiding a collision between base-band resources utilized by a second subscription of the UE and the SRS for the uplink. In some aspects, the method may include transmitting one or more radio resource control (RRC) signals indicating that the one or more data transmission timing parameters of the one or more data elements are scheduled based on the modification of the one or more data transmission timing parameters requested in the one or more MAC-CEs. In some aspects, the method may include receiving the SRS on the uplink according to the modification of the one or more data transmission timing parameters requested in the one or more MAC-CEs. In some aspects, the one or more data elements comprise at least a channel state information (CSI) reference signal (CSI-RS) for a downlink. In some aspects, the one or more data transmission timing parameters may include at least an CSI-ReportPeriodicity-AndOffset value for avoiding a collision between the base-band resources utilized by a second subscription of the UE and the CSI-RS for the downlink. In some aspects, the method may include transmitting one or more radio resource control (RRC) signals indicating that the one or more data transmission timing parameters of the one or more data elements are scheduled based on the modification of the one or more data transmission timing parameters requested in the one or more MAC-CEs. In some aspects, the method may further include transmitting the CSI-RS on the downlink according to the modification of the one or more data transmission timing parameters requested in the one or more MAC-CEs.

A user equipment (UE) in a wireless communication system and having a first subscription and a second subscription is provided. The UE includes a wireless transceiver. The UE also includes a memory. The UE further includes a processor communicatively coupled to the wireless transceiver and the memory. The processor and the memory are configured to identify one or more base-band resource outage periods associated with the first subscription based on a utilization of at least partially shared base-band resources by the second subscription. The processor and the memory are also configured to transmit one or more medium access control (MAC) control elements (MAC-CEs) to a base station requesting a modification of one or more data transmission timing parameters of one or more data elements associated with the first subscription based on the one or more base-band resource outage periods associated with the first subscription.

A base station in a wireless communication system is provided. The base station includes a wireless transceiver. The base station also includes a memory. The base station further includes a processor communicatively coupled to the wireless transceiver and the memory. The processor and the memory are configured to receive one or more medium access control (MAC) control elements (MAC-CEs) from a user equipment (UE) requesting a modification of one or more data transmission timing parameters associated with a first subscription based on one or more base-band resource outage periods associated with the first subscription. The processor and the memory are also configured to schedule a transmission of one or more data elements between the UE and the base station based on the modification of the one or more data transmission timing parameters requested in the one or more MAC-CEs.

A non-transitory, processor-readable storage medium of a user equipment (UE) having a first subscription, a second subscription, and instructions stored thereon is provided. The instructions, when executed by a processing circuit, cause the processing circuit to identify one or more base-band resource outage periods associated with the first subscription based on a utilization of at least partially shared base-band resources by the second subscription. The instructions, when executed by the processing circuit, also cause the processing circuit to transmit one or more medium access control (MAC) control elements (MAC-CEs) to a base station requesting a modification of one or more data transmission timing parameters of one or more data elements associated with the first subscription based on the one or more base-band resource outage periods associated with the first subscription.

A non-transitory, processor-readable storage medium of a base station having instructions stored thereon is provided. The instructions, when executed by a processing circuit, cause the processing circuit to receive one or more medium access control (MAC) control elements (MAC-CEs) from a user equipment (UE) requesting a modification of one or more data transmission timing parameters associated with a first subscription based on one or more base-band resource outage periods associated with the first subscription. The instructions, when executed by the processing circuit, also cause the processing circuit to schedule a transmission of one or more data elements between the UE and the base station based on the modification of the one or more data transmission timing parameters requested in the one or more MAC-CEs.

A user equipment (UE) having a first subscription and a second subscription is provided. The UE includes a means for identifying one or more base-band resource outage periods associated with the first subscription based on a utilization of at least partially shared base-band resources by the second subscription. The UE also includes a means for transmitting one or more medium access control (MAC) control elements (MAC-CEs) to a base station requesting a modification of one or more data transmission timing parameters of one or more data elements associated with the first subscription based on the one or more base-band resource outage periods associated with the first subscription.

A base station is provided. The base station includes a means for receiving one or more medium access control (MAC) control elements (MAC-CEs) from a user equipment (UE) requesting a modification of one or more data transmission timing parameters associated with a first subscription based on one or more base-band resource outage periods associated with the first subscription. The base station also includes a means for scheduling a transmission of one or more data elements between the UE and the base station based on the modification of the one or more data transmission timing parameters requested in the one or more MAC-CEs.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
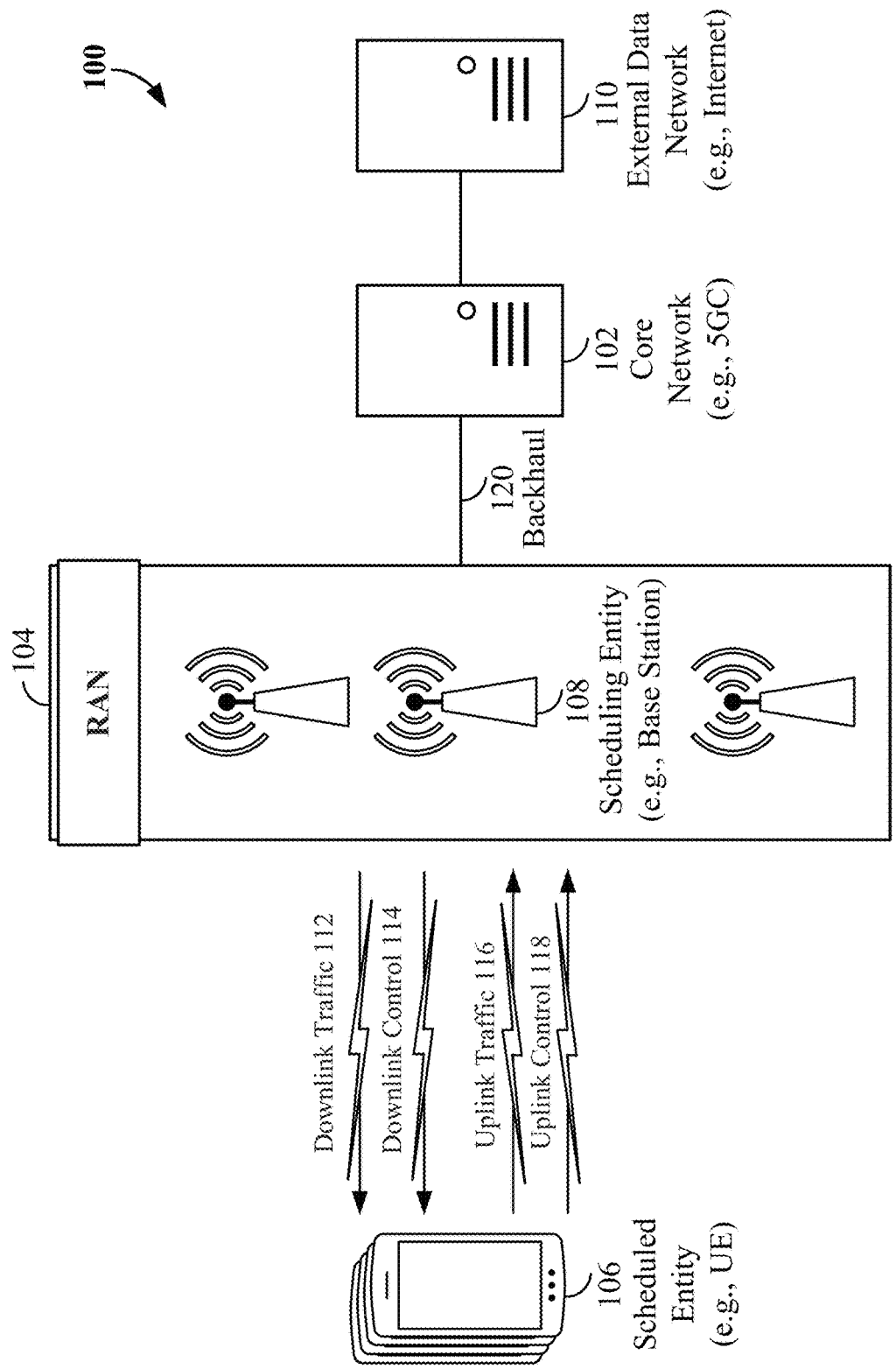
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Wireless communication between devices may be facilitated by various network configurations. In one configuration, a cellular network may enable wireless communication devices (e.g., user equipment (UEs)) to communicate with one another through signaling with a nearby base station or cell. In some aspects, a UE may be configured for SRS-config through a radio resource control (RRC) message. An information element (IE) of within the SRS-config may provide information for sounding reference signal (SRS) transmission including antenna ports, frequency, and time domain resource to transmit an SRS. SRSs may be transmitted by the UE to a base station to assist the network with measuring an uplink propagation channel. In some aspects, uplink signal-to-interference-and-noise ratio (SINR) may be measured from the SRS and may be an input to link adaption.

In some aspects, a UE may be configured for CSI-ReportConfig through an RRC message. An information element (IE) of within the CSI-ReportConfig may provide the UE within information concerning channel state information (CSI) quantities (e.g., channel quality information (CQI), precoding matrix indication (PMI), rank indication (RI), or the like). A ResourcesForChannelMeasurement IE include in the CSI-ReportConfig may indicate to a UE about a choice of nzp-CSI-RS-ResourceSetList which may have information about CSI-RS-ResourceMapping which may provide information about an actual CSI-RS being transmitted in the downlink and may enable a UE to perform measurements and report back to the network through the base station CSI quantities.

For multi-subscriber identification module (MSIM), for example, associated with at least a first subscription (e.g., a digital data subscription (DDS)) and a second subscription (e.g., a non-DDS), base-band resources may be shared by both the first subscription and the second subscription. In some aspects, a non-DDS may include a voice subscription. When the second subscription is utilizing resources for page decoding, a tune away or gap may be created placing the first subscription in an outage time period unbeknownst to the base station and the network. SRS resources may be configured for periodic transmissions and may often be transmitted during the outage time period causing the UE to unsuccessfully transmit the SRS. If the configured SRS-PeriodicityAndOffset is such that it always or frequently collides with the base-band resources during the outage time period, the base station and network may have difficulty performing channel estimation. Similarly, CSI-RS resources/reporting may be configured for period transmission and may often be transmitted during the outage time period causing the UE to miss reception of the CSI-RS resources/reporting to decode these reference signals, prevent the performance of required computations (e.g., CQI, RI, PMI, or the like), and prevent the UE from reporting back the required information to the base station and network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108 (e.g., a RAN entity, RAN node, or the like). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
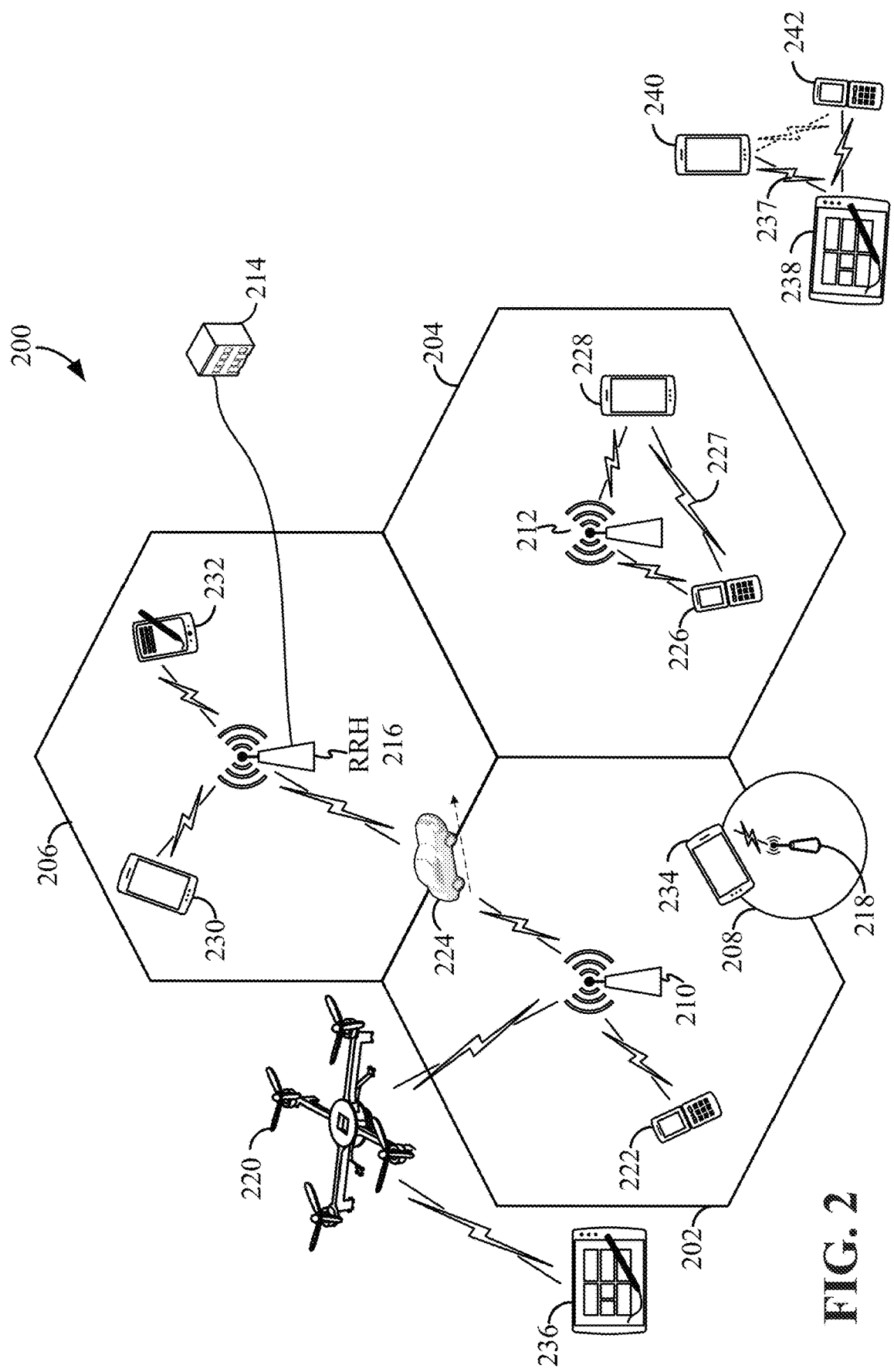
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIGS. 1 and/or 2) for all the UEs in the respective cells. For example, UEs 222 and 224 may be in communication with base station 210; UEs 226 and 228 may be in communication with base station 412; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Base stations 210, 212, 214, 218 may operate as scheduling entities, scheduling resources for communication among the UEs within their service areas or cells 202, 204, 206, 208, respectively. However, base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 246. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an AMF.

A RAN 200 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time.

Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
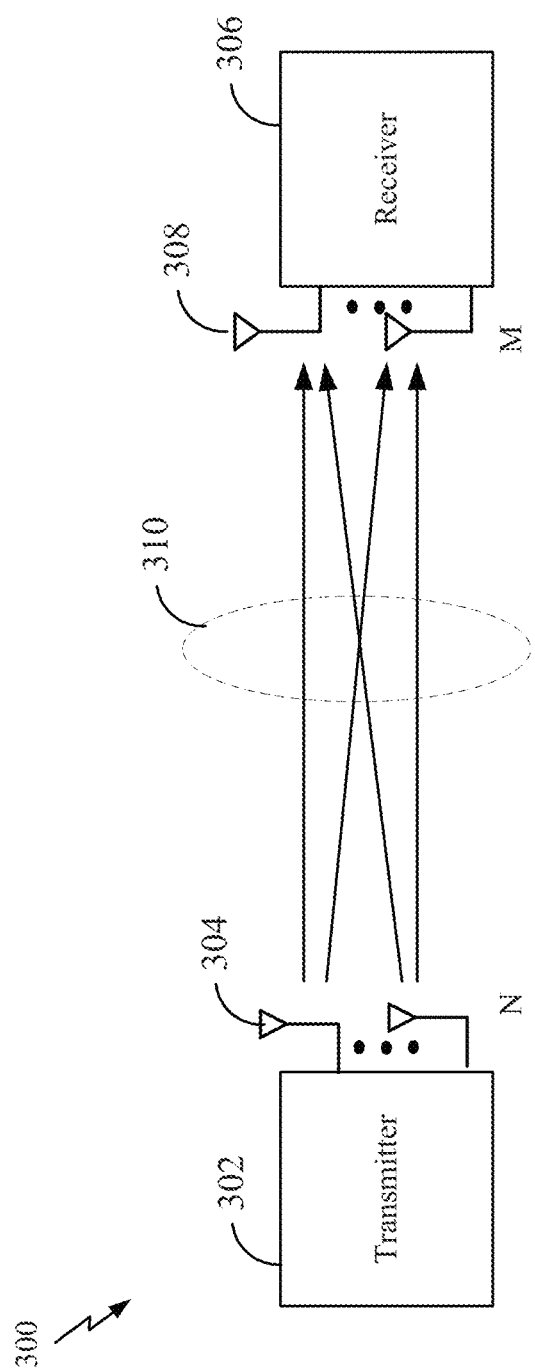
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit a channel state information-reference signal (CSI-RS) with separate C-RS sequences for each layer to provide for multi-layer channel estimation. From the CSI-RS, the UE may measure the channel quality across layers and resource blocks and feedback a channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306. A beam may be formed by, but not limited to, an antenna, an antenna port, an antenna element, a group of antennas, a group of antenna ports or a group of antenna elements.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
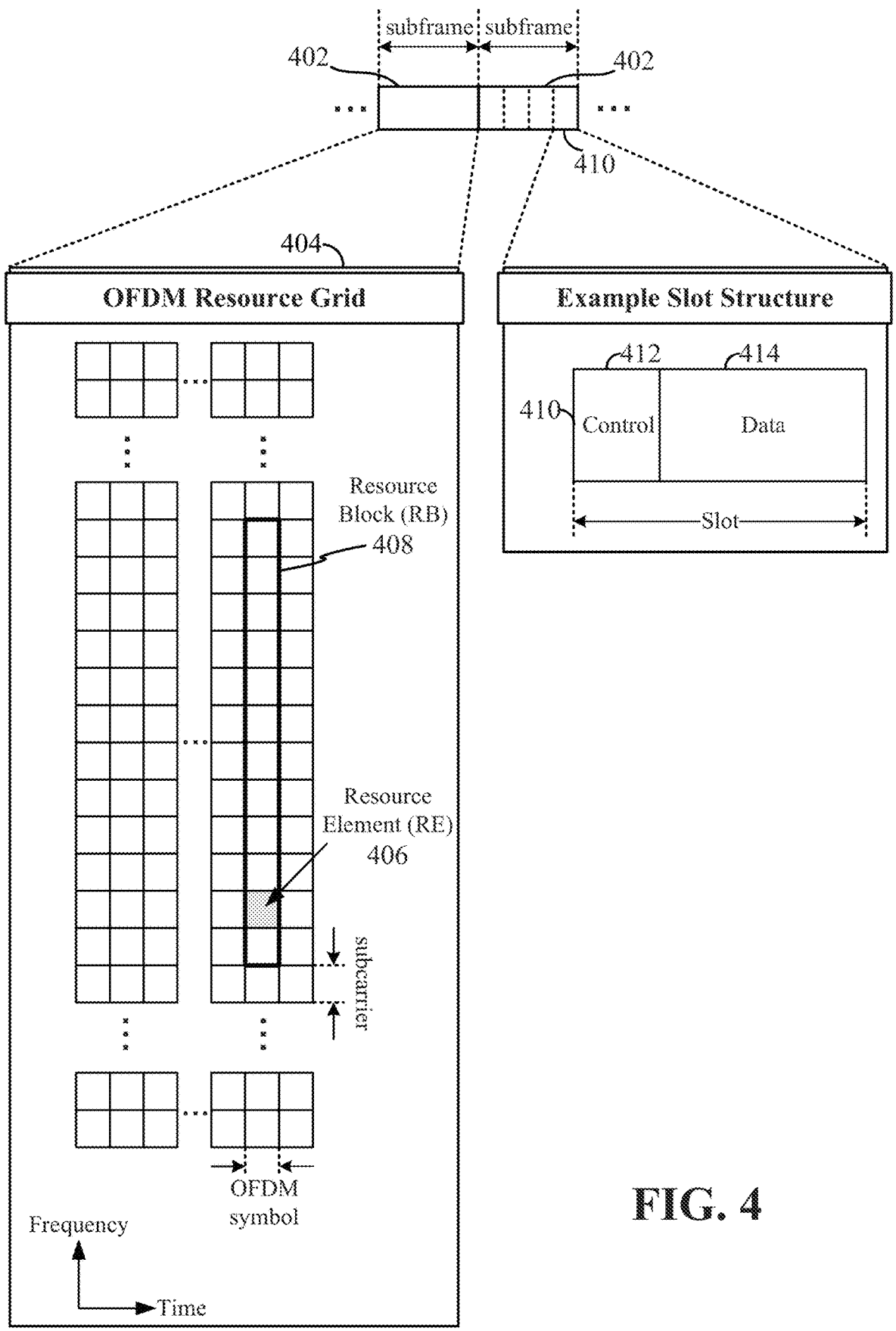
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (e.g., scheduled entities) for downlink or uplink transmissions typically involves scheduling one or more resource elements 406 within one or more sub-bands or BWPs. Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels.

Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Various aspects of the disclosure relate to a scheduling entity (e.g., a UE, a base station) scheduling a scheduled entity (e.g., another UE) component carriers for sidelink communication. When the scheduling entity is a UE, the scheduling entity may identify a plurality of component carriers for sidelink communication with at least one other UE. The scheduling entity may select a carrier aggregation configuration including one or more component carriers of the plurality of component carriers for sidelink communication with the at least one other UE. The scheduling entity may transmit the carrier aggregation configuration to at least one UE of the two or more UEs for sidelink communication with the at least one other UE. The scheduling entity may receive a signal from the at least one other UE using at least one component carrier of the one or more component carriers of the carrier aggregation configuration.

Similarly, various aspects of the disclosure relate to a scheduling entity (e.g., a UE, a base station) scheduling a scheduled entity (e.g., another UE) component carriers for sidelink communication. When the scheduling entity is a base station, the scheduling entity may identify a plurality of component carriers for sidelink communication between two or more UEs. The scheduling entity may select a carrier aggregation configuration including one or more component carriers of the plurality of component carriers for sidelink communication between the two or more UEs. The scheduling entity may transmit the carrier aggregation configuration to the two or more UEs for sidelink communication between the two or more UEs. The first UE may transmit and/or receive a signal from the second UE using at least one component carrier of the one or more component carriers of the carrier aggregation configuration.

For multi-subscriber identification module (MSIM), for example, associated with at least a first subscription (e.g., a digital data subscription (DDS)) and a second subscription (e.g., a non-DDS), base-band resources may be shared by both the first subscription and the second subscription. In some aspects, a non-DDS may include a voice subscription. When the second subscription is utilizing resources for page decoding, a tune away or gap may be created placing the first subscription in an outage time period unbeknownst to the base station and the network. SRS resources may be configured for periodic transmissions and may often be transmitted during the outage time period causing the UE to unsuccessfully transmit the SRS. If the configured SRS-PeriodicityAndOffset is such that it always or frequently collides with the base-band resources during the outage time period, the base station and network may have difficulty performing channel estimation. Similarly, CSI-RS resources/reporting may be configured for period transmission and may often be transmitted during the outage time period causing the UE to miss reception of the CSI-RS resources/reporting to decode these reference signals, prevent the performance of required computations (e.g., CQI, RI, PMI, or the like), and prevent the UE from reporting back the required information to the base station and network.

Figure 5:
FIG. 5 illustrates an example table of SRS-Periodicity-AndOffset values according to some aspects.

In some aspects, a new medium access control (MAC) control element (MAC-CE) may be used to request the network to modify the SRS-PeriodicityAndOffset value so that the first subscription page decode does not collide with the SRS transmission time domain resources. FIG. 5 illustrates an example table 500 of SRS-PeriodicityAndOffset values according to 3GPPTS 138.331 v16.10 according to some aspects. In response, the network may modify parameters accordingly and inform the UE of the new set of parameters through RRC signaling. In some aspects, the UE may compute collision occurrences of the SRS transmissions with the outage time period and inform the network accordingly via an uplink MAC-CE with value to avoid the outage time period.

In some aspects, a new medium access control (MAC) control element (MAC-CE) may be used to request the network to modify the CSI-ReportPeriodicityAndOffset value so that the first subscription page decode does not collide with the periodic downlink CSI-RS. In response, the network may modify parameters accordingly and inform the UE of the new set of parameters through RRC signaling. In some aspects, the UE may compute collision occurrences of the downlink CSI-RS transmissions with the outage time period and inform the network accordingly via an uplink MAC-CE with value to avoid the outage time period.

In some aspects, user equipment having at least a first subscription and a second subscription may identify one or more base-band resource outage periods associated with the first subscription based on a utilization of at least partially shared base-band resources by the second subscription and may transmit one or more medium access control (MAC) control elements (MAC-CEs) to a base station requesting a modification of one or more data transmission timing parameters of one or more data elements associated with the first subscription based on the one or more base-band resource outage periods associated with the first subscription.

In some aspects, a base station may receive one or more medium access control (MAC) control elements (MAC-CEs) from a user equipment (UE) requesting a modification of one or more data transmission timing parameters associated with a first subscription based on one or more base-band resource outage periods associated with the first subscription and may schedule a transmission of one or more data elements between the UE and the base station based on the modification of the one or more data transmission timing parameters requested in the one or more MAC-CEs.

Figure 6:
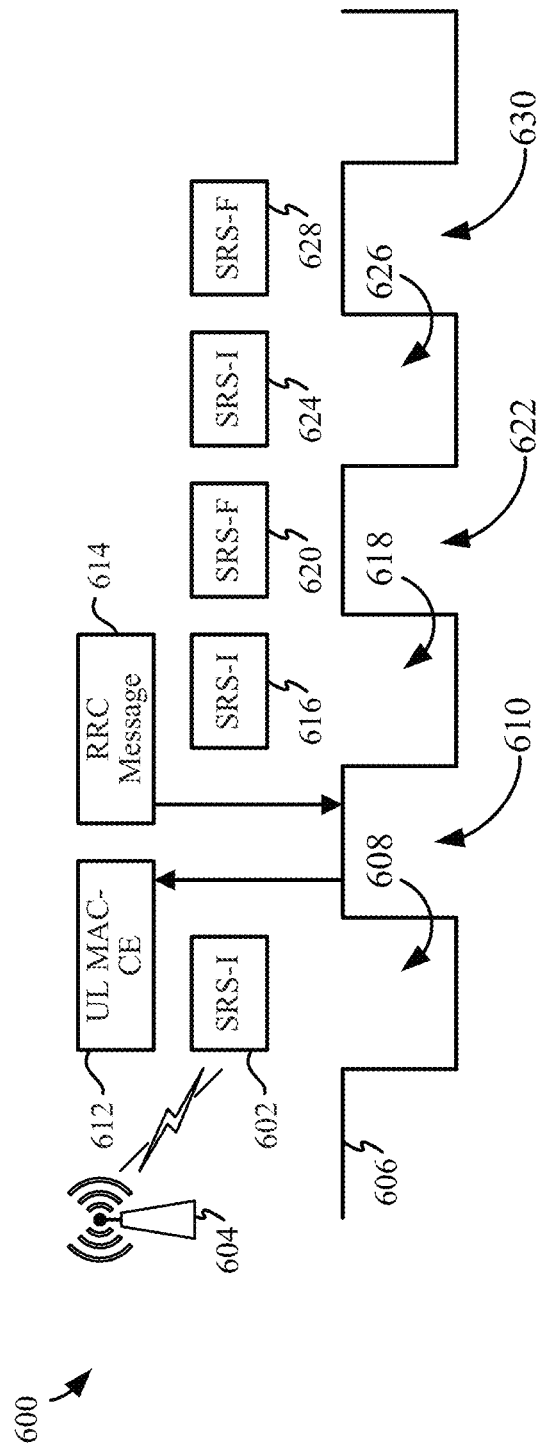
FIG. 6 is a conceptual illustration of an example environment for transmitting indications of channel qualities for uplink and downlink transmission involving multi-subscriber identification module (MSIM) devices according to some aspects.

FIG. 6 is a conceptual signaling diagram illustrating an example environment 600 for transmitting indications of channel qualities for uplink and downlink transmission involving multi-subscriber identification module (MSIM) devices according to some aspects. As shown in FIG. 6, a UE may transmit a first initial sounding reference signal (SRS-I) 602 associated with a first subscription to a base station 604 in the time domain represented by the timeline 606 at a first outage time period 608. The first outage time period 608 may be a time when base-band resources are received for a second subscription causing the first SRS-I 602 to collide with the base-band resources associated with the second subscription and preventing the first SRS-I 602 from being transmitted to the base station 604. The UE may detect the collision and identify the first outage time period 608. During a subsequent non-outage time period 610, the UE may transmit an uplink MAC-CE 612 to the base station 604. The uplink MAC-CE 612 may include a request to modify one or more data transmission timing parameters associated with a first subscription based on one or more base-band resource outage time periods associated with the first subscription.

The base station 604 may receive the uplink MAC-CE 612 and schedule a transmission of one or more subsequent SRSs between the UE and the base station based on the modification of the one or more data transmission timing parameters requested in the uplink MAC-CE. The base station 604 may transmit an RRC message 614 indicating that one or more subsequent SRSs are to be transmitted at new times that do not align with subsequent outage time periods. For example, the RRC message 614 may indicate that a second SRS-I 616 is not to be transmitted during a second outage time period 618 and instead is time adjusted or modified to a second final SRS (SRS-F) 620 that is to be transmitted during a second non-outage time period 622 for successful transmission with the base station 604. Similarly, the RRC message 614 may also indicate that a third SRS-I 624 is not to be transmitted during a third outage time period 626 and instead is time adjusted or modified to a third SRS-F 628 that is to be transmitted during a third non-outage time period 630 for successful transmission with the base station 604. After receiving the RRC message 614, the UE may transmit the second SRS-F 620 as the time adjusted or modified SRS during the second non-outage time period 622 and the third SRS-F 628 as the time adjusted or modified SRS during the third non-outage time period 630.

Figure 7:
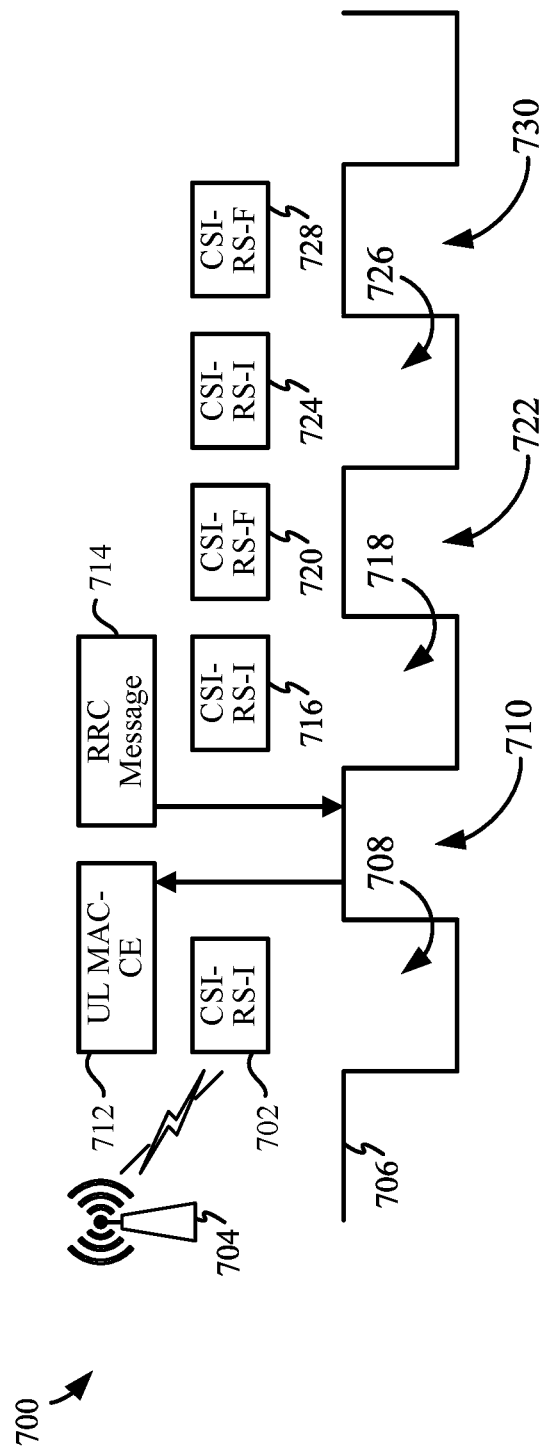
FIG. 7 is another conceptual illustration of an example environment for transmitting indications of channel qualities for uplink and downlink transmission involving multi-subscriber identification module (MSIM) devices according to some aspects.

FIG. 7 is a conceptual signaling diagram illustrating an example environment 700 for transmitting indications of channel qualities for uplink and downlink transmission involving multi-subscriber identification module (MSIM) devices according to some aspects. As shown in FIG. 7, a UE may receive a first initial CSI-RS (CSI-RS-I) 702 associated with a first subscription from a base station 704 in the time domain represented by the timeline 706 at a first outage time period 708. The first outage time period 708 may be a time when base-band resources are received for a second subscription causing the first CSI-RS-I 702 to collide with the base-band resource associated with the second subscription and preventing the first CSI-RS-I 702 from being received from the base station 704. The UE may detect the collision and identify the first outage period 708. During a subsequent non-outage time period 710, the UE may transmit an uplink MAC-CE 712 to the base station 704. The uplink MAC-CE 712 may include a request to modify one or more data transmission timing parameters associated with a first subscription based on one or more base-band resource outage time periods associated with the first subscription.

The base station 704 may receive the uplink MAC-CE 712 and schedule a transmission of one or more subsequent CSI-RSs between the UE and the base station based on the modification of the one or more data transmission timing parameters requested in the uplink MAC-CE. The base station 704 may transmit an RRC message 714 indicating that one or more subsequent CSI-RSs are to be transmitted at new times that do not align with subsequent outage time periods. For example, the RRC message 714 may indicate that a second CSI-RS-I 716 is not to be transmitted during a second outage time period 718 and instead is time adjusted or modified to a second final CSI-RS (CSI-RS-F) 720 that is to be transmitted during a second non-outage time period 722 for successful transmission with the base station 704. Similarly, the RRC message 714 may also indicate that a third CSI-RS-I 724 is not to be transmitted during a third outage time period 726 and instead is time adjusted or modified to a third CSI-RS-F 728 that is to be transmitted during a third non-outage time period 730 for successful transmission with the base station 704. After receiving the RRC message 714, the UE may receive the second CSI-RS-F 720 during the second non-outage time period 722 and the third CSI-RS-F 728 during the third non-outage time period 730.

Figure 8:
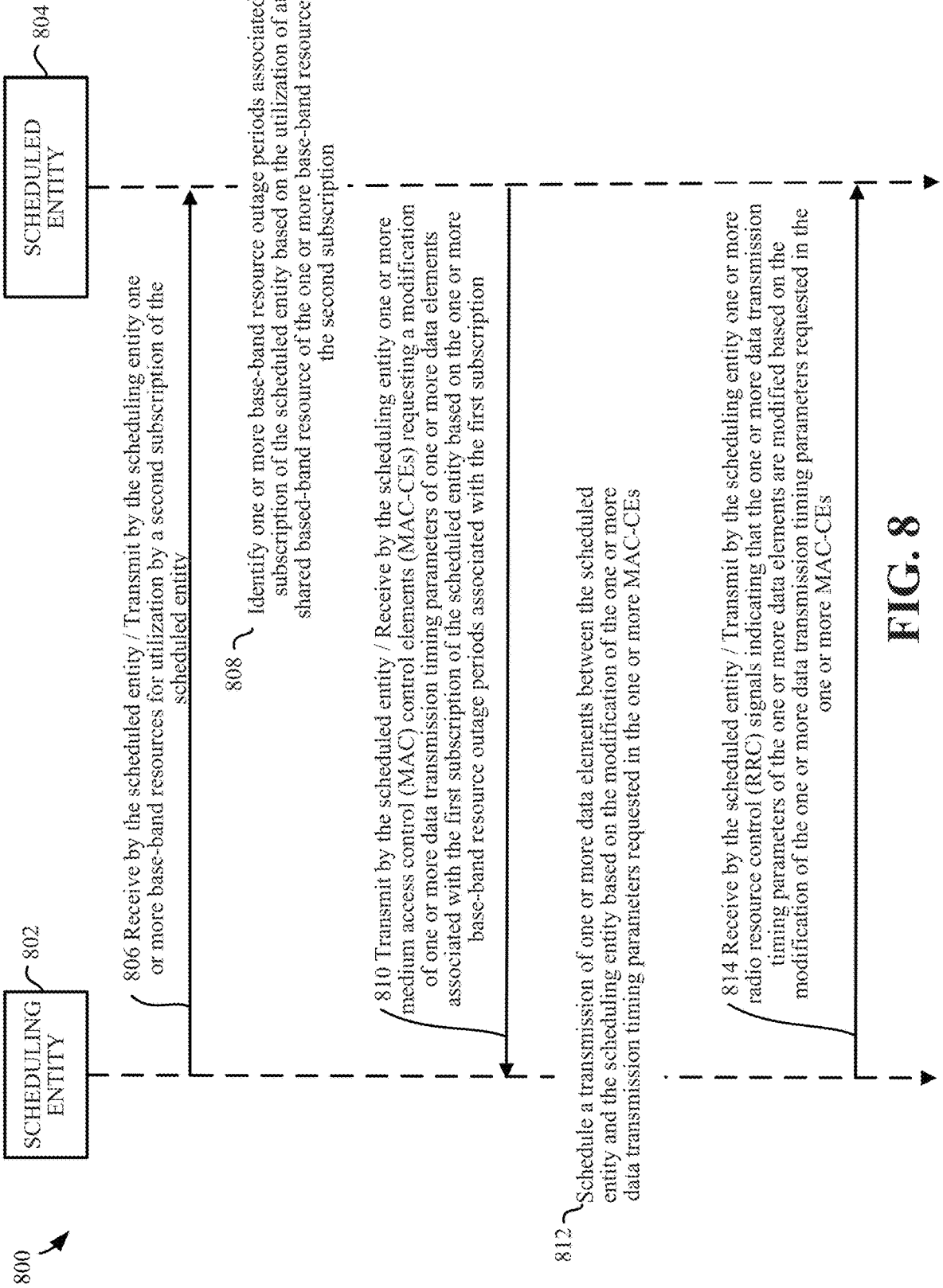
FIG. 8 is yet another conceptual illustration of an example environment for transmitting indications of channel qualities for uplink and downlink transmission involving multi-subscriber identification module (MSIM) devices according to some aspects.

FIG. 8 is a conceptual signaling diagram illustrating an example environment 800 for transmitting indications of channel qualities for uplink and downlink transmission involving multi-subscriber identification module (MSIM) devices according to some aspects. In the example shown in FIG. 8, a scheduling entity 802 is in wireless communication with a scheduled entity 804 over a wireless communication link Each of the scheduling entity 802 and the scheduled entity 804 may correspond to any of the entities, gNodeBs, UEs, V2X device, or D2D devices shown in FIGS. 1-3 and 5. In some aspects, the scheduling entity 802 may be a base station or an gNodeB (gNB) and the wireless communication link may be an access link (e.g., an uplink). In some aspects, the scheduling entity 804 may be a user equipment (UE). The scheduling entity 802 may be in wireless communication with a plurality of scheduled entities.

At 806, the scheduling entity 802 may transmit for reception of the scheduled entity 804 one or more base-band resources for utilization by a second subscription of the scheduled entity 804. For example, the scheduled entity 804 may be a multi-subscriber identification module (MSIM) device having at least a first subscription and a second subscription. The first subscription may be associated with a digital data subscription (DDS) and the second subscription may be associated with a non-DDS. In some aspects, the non-DDS may include a voice subscription. The scheduled entity 804 may receive from the scheduling entity 802 one or more base-band resource as data decoding resources for decoding data received by the scheduled entity 804 for utilization by the second subscription of the scheduled entity 804.

At 808, the scheduled entity 804 may identify one or more base-band resource outage periods associated with a first subscription of the scheduled entity 804. In some examples, the scheduled entity 804 may identify one or more base-band resource outage periods associated with the first subscription of the scheduled entity 804 based on the utilization of at least one shared base-band resources of the one or more base-band resources utilized by the second subscription of the scheduled entity 804. For example, at least one base-band resource may be utilized (e.g., shared) by both the first subscription and the second subscription. The scheduled entity 804 may identify one or more base-band resource outage periods associated with the first subscription of the scheduled entity 804 based on the utilization of the at least one shared base-band resource of the one or more base-band resources for utilization by both the first subscription of the scheduled entity 804 and the second subscription of the scheduled entity 804. In some aspects, the scheduled entity 804 identifying the one or more base-band resource outage periods associated with the first subscription based on the utilization of the base-band resources by the second subscription may include detecting a collision between the base-band resources for utilization by the second subscription and one or more SRSs on the uplink. In some aspects, the scheduled entity 804 identifying the one or more base-band resource outage periods associated with the first subscription based on the utilization of the base-band resources by the second subscription may include detecting a collision between the base-band resources utilized by the second subscription and one or more CSI-RSs on the downlink.

At 810, the scheduled entity 804 transmits for reception by the scheduling entity 802 one or more medium access control (MAC) control elements (MAC-CEs) requesting a modification of one or more data transmission timing parameters of one or more data elements associated with the first subscription based on the one or more base-band resource outage periods associated with the first subscription. In some aspects, the one or more data elements may include at least a sounding reference signal (SRS) for an uplink. For example, the scheduled entity 804 may transmit for reception by the scheduling entity 802 one or more medium access control (MAC) control elements (MAC-CEs) requesting a modification of one or more data transmission timing parameters of one or more SRSs associated with the first subscription based on the one or more base-band resource outage periods associated with the first subscription. In some aspects, the one or more data transmission timing parameters comprise at least an SRS-PeriodicityAndOffset value for avoiding a collision between the base-band resources utilized by the second subscription and the SRS for the uplink. In some aspects, the one or more data elements comprise at least a channel state information (CSI) reference signal (CSI-RS) for a downlink. For example, the scheduled entity 804 may transmit for reception by the scheduling entity 802 one or more medium access control (MAC) control elements (MAC-CEs) requesting a modification of one or more data transmission timing parameters of one or more CSI-RSs associated with the first subscription based on the one or more base-band resource outage periods associated with the first subscription. In some aspects, the one or more data transmission timing parameters comprise at least an CSI-ReportPeriodicityAndOffset value for avoiding a collision between the base-band resources utilized by the second subscription and the CSI-RS for the downlink.

At 812, the scheduling entity 802 may schedule a transmission of one or more data elements between the scheduled entity 804 and the scheduling entity 802 based on the modification of the one or more data transmission timing parameters requested in the one or more MAC-CEs. For example, the scheduling entity 802 may receive an uplink MAC-CE and schedule a transmission of one or more subsequent data elements between the scheduled entity 804 and the scheduling entity 802 based on the modification of the one or more data transmission timing parameters requested in the uplink MAC-CE. The scheduling entity 802 may schedule a first subsequent data element so that the first subsequent data element is not to be transmitted during a first subsequent outage time period and instead is time adjusted or modified for transmission during a first subsequent non-outage time period for successful transmission with the scheduling entity 802. Similarly, the scheduling entity 802 may schedule a second subsequent data element so that the second subsequent data element is not to be transmitted during a second subsequent outage time period and instead is time adjusted or modified for transmission during a second subsequent non-outage time period for successful transmission with the scheduling entity 802.

At 814, the scheduled entity 804 may receive from the scheduling entity 802 one or more radio resource control (RRC) signals indicating that the one or more data transmission timing parameters of the one or more data elements are modified based on the modification of the one or more data transmission timing parameters requested in the one or more MAC-CEs. For example, the scheduled entity 804 may receive from the scheduling entity 802 one or more radio resource control (RRC) signals indicating that the one or more data transmission timing parameters of the one or more SRSs are modified based on the modification of the one or more data transmission timing parameters requested in the one or more MAC-CEs. The scheduled entity 804 may subsequently transmit one or more SRSs on the uplink to the scheduling entity 802 according to the modification of the one or more data transmission timing parameters requested in the one or more MAC-CEs. As another example, the scheduled entity 804 may receive from the scheduling entity 802 one or more radio resource control (RRC) signals indicating that the one or more data transmission timing parameters of the one or more CSI-RSs are modified based on the modification of the one or more data transmission timing parameters requested in the one or more MAC-CEs. The scheduled entity 804 may subsequently receive one or more CSI-RSs on the downlink from the scheduling entity 802 according to the modification of the one or more data transmission timing parameters requested in the one or more MAC-CEs.

Figure 9:
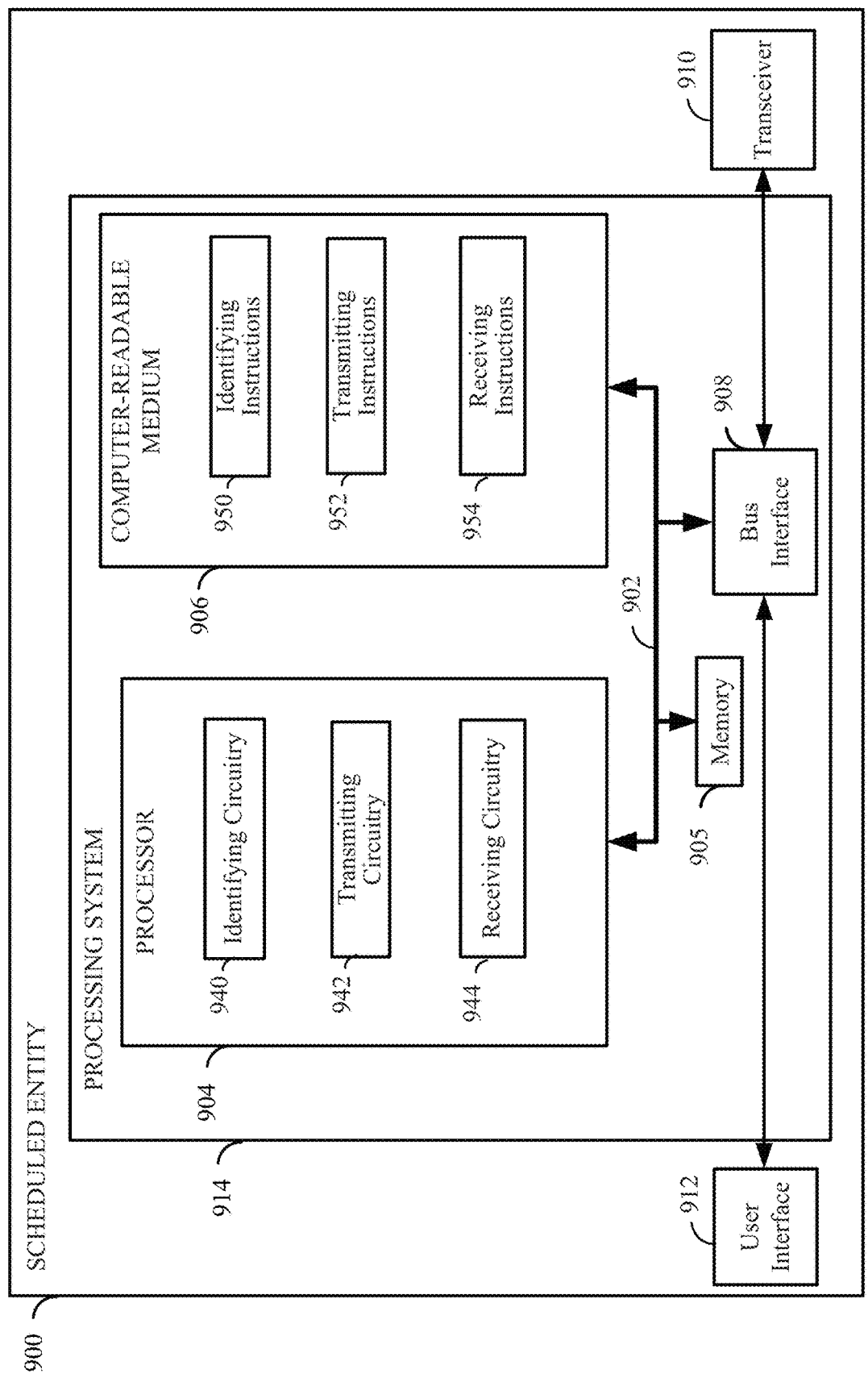
FIG. 9 is a block diagram illustrating an example of a hardware implementation for a scheduled entity employing a processing system according to some aspects.

FIG. 9 is a block diagram illustrating an example of a hardware implementation for a scheduled entity 900 employing a processing system 914. For example, the scheduled entity 900 may be any of the user equipment (UEs) illustrated in any one or more of FIGS. 1-3 and 6-8.

The scheduled entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 900 may be configured to perform any one or more of the functions described herein. That is, the processor 904, as utilized in the scheduled entity 900, may be used to implement any one or more of the processes described herein. The processor 904 may in some instances be implemented via a baseband or modem chip and in other implementations, the processor 904 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), and computer-readable media (represented generally by the computer-readable storage medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium (e.g., air interface). A user interface 912 (e.g., keypad, display, speaker, microphone, joystick) may also be provided.

The processor 904 is responsible for managing the bus 902 and general processing, including the execution of software stored on the computer-readable storage medium 906. The software, when executed by the processor 904, causes the processing system 914 to perform the various functions described herein for any particular apparatus. The computer-readable storage medium 906 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 906.

The computer-readable storage medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 906 may reside in the processing system 914, external to the processing system 914, or distributed across multiple entities including the processing system 914. The computer-readable storage medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include identifying circuitry 940 configured to identify one or more base-band resource outage periods associated with the first subscription based on a utilization of at least partially shared base-band resources by the second subscription. The identifying circuitry 940 may be configured to execute identifying instructions 950 stored in the computer-readable storage medium 906 to implement any of the one or more of the functions described herein.

The processor 904 may also include transmitting circuitry 942 configured to transmit one or more medium access control (MAC) control elements (MAC-CEs) to a base station requesting a modification of one or more data transmission timing parameters of one or more data elements associated with the first subscription based on the one or more base-band resource outage periods associated with the first subscription. The transmitting circuitry 942 may also be configured to transmit one or more sounding reference signals (SRSs) on the uplink according to the modification of the one or more data transmission timing parameters requested in the one or more MAC-CEs. The transmitting circuitry 942 may be configured to execute transmitting instructions 952 stored in the computer-readable storage medium 906 to implement any of the one or more of the functions described herein.

The processor 904 may further include receiving circuitry 944 configured to receive one or more radio resource control (RRC) signals indicating that the one or more data transmission timing parameters of the one or more data elements are modified based on the modification of the one or more data transmission timing parameters requested in the one or more MAC-CEs. The receiving circuitry 944 may also be configured to receive one or more channel state information (CSI) reference signals (CSI-RSs) on the downlink according to the modification of the one or more data transmission timing parameters requested in the one or more MAC-CEs. The receiving circuitry 944 may further be configured to receive one or more base-band resources for utilization by a second subscription of the scheduled entity 900. The receiving circuitry 944 may be configured to execute receiving instructions 954 stored in the computer-readable storage medium 906 to implement any of the one or more of the functions described herein.

Figure 10:
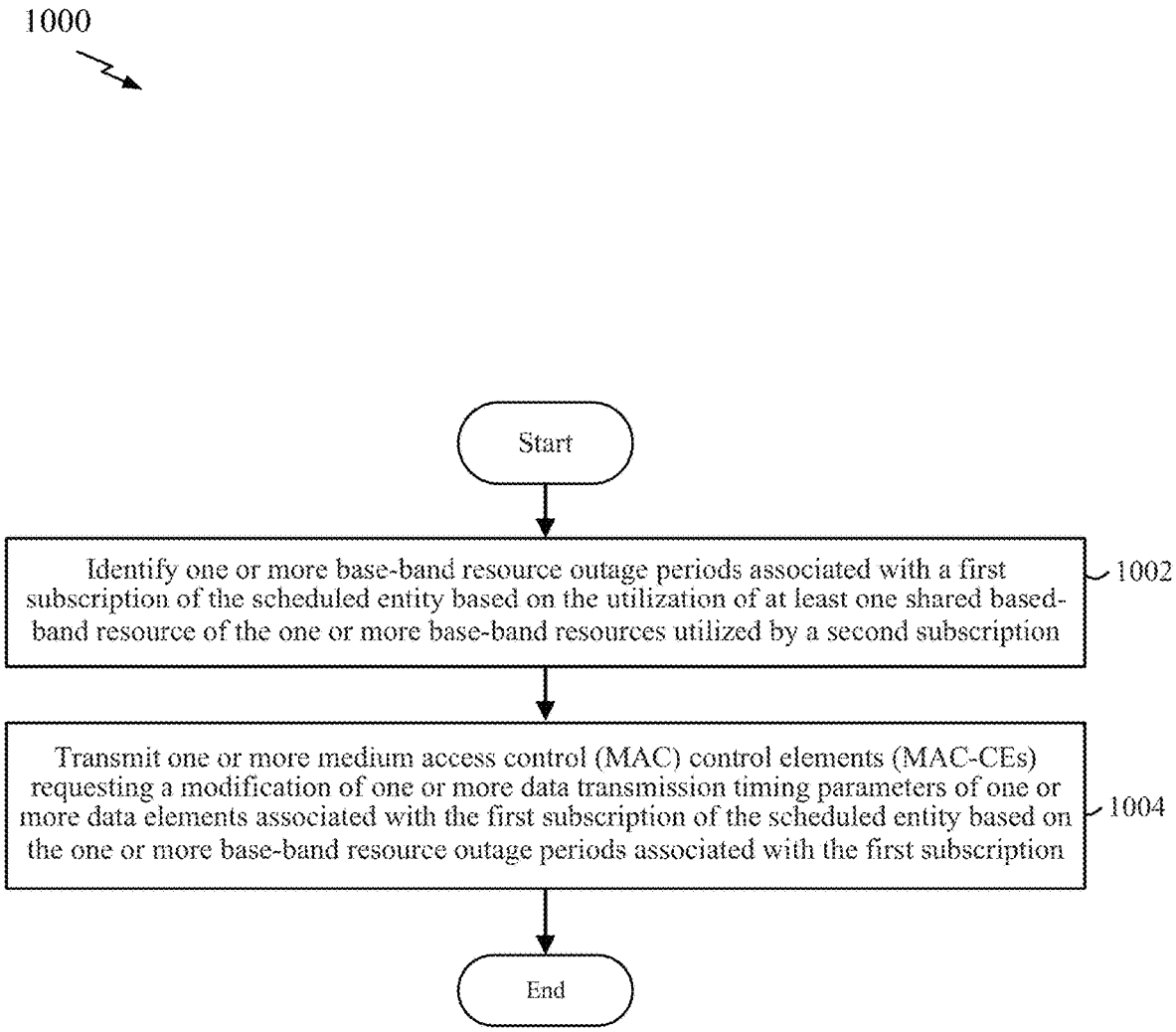
FIG. 10 is a flow chart of a method for transmitting indications of channel qualities for uplink and downlink transmission involving MSIM devices according to some aspects.

FIG. 10 is a flow chart 1000 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduled entity 900, as described herein, and illustrated in FIG. 9, by a processor or processing system, or by any suitable means for carrying out the described functions.

At block 1002, the scheduled entity 900 may identify one or more base-band resource outage periods associated with a first subscription based on a utilization of at least partially shared base-band resources by the second subscription. In some examples, the scheduled entity 900 may identify one or more base-band resource outage periods associated with the first subscription of the scheduled entity 900 based on the utilization of at least one shared base-band resources of the one or more base-band resources utilized by the second subscription of the scheduled entity 804. For example, at least one base-band resource may be utilized (e.g., shared) by both the first subscription and the second subscription. The scheduled entity 900 may identify one or more base-band resource outage periods associated with the first subscription of the scheduled entity 900 based on the utilization of the at least one shared base-band resource of the one or more base-band resources for utilization by both the first subscription of the scheduled entity 900 and the second subscription of the scheduled entity 900. In some aspects, the scheduled entity 900 identifying the one or more base-band resource outage periods associated with the first subscription based on the utilization of the base-band resources by the second subscription may include detecting a collision between the base-band resources for utilization by the second subscription and one or more SRSs on the uplink. In some aspects, the scheduled entity 900 identifying the one or more base-band resource outage periods associated with the first subscription based on the utilization of the base-band resources by the second subscription may include detecting a collision between the base-band resources utilized by the second subscription and one or more CSI-RSs on the downlink. The identifying circuitry 940, shown and described above in connection with FIG. 9 may provide a means to identify one or more base-band resource outage periods associated with a first subscription based on a utilization of at least partially shared base-band resources by the second subscription.

At block 1004, the scheduled entity 900 may transmit one or more medium access control (MAC) control elements (MAC-CEs) to a base station requesting a modification of one or more data transmission timing parameters of one or more data elements associated with the first subscription based on the one or more base-band resource outage periods associated with the first subscription. In some aspects, the one or more data elements may include at least a sounding reference signal (SRS) for an uplink. For example, the scheduled entity 900 may transmit for reception by the scheduling entity 802 one or more medium access control (MAC) control elements (MAC-CEs) requesting a modification of one or more data transmission timing parameters of one or more SRSs associated with the first subscription based on the one or more base-band resource outage periods associated with the first subscription. In some aspects, the one or more data transmission timing parameters comprise at least an SRS-PeriodicityAndOffset value for avoiding a collision between the base-band resources utilized by the second subscription and the SRS for the uplink. In some aspects, the one or more data elements comprise at least a channel state information (CSI) reference signal (CSI-RS) for a downlink. For example, the scheduled entity 900 may transmit for reception by the scheduling entity one or more medium access control (MAC) control elements (MAC-CEs) requesting a modification of one or more data transmission timing parameters of one or more CSI-RSs associated with the first subscription based on the one or more base-band resource outage periods associated with the first subscription. In some aspects, the one or more data transmission timing parameters comprise at least an CSI-Report-PeriodicityAndOffset value for avoiding a collision between the base-band resources utilized by the second subscription and the CSI-RS for the downlink. The transmitting circuitry 942 together with the transceiver 910, shown and described above in connection with FIG. 9 may provide a means to transmit one or more medium access control (MAC) control elements (MAC-CEs) to a base station requesting a modification of one or more data transmission timing parameters of one or more data elements associated with the first subscription based on the one or more base-band resource outage periods associated with the first subscription.

In one configuration, the scheduled entity 900 includes means for performing the various functions and processes described in relation to FIG. 10. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1-3 and 6-8 and utilizing, for example, the processes and/or algorithms described herein in relation to FIG. 10.

Figure 11:
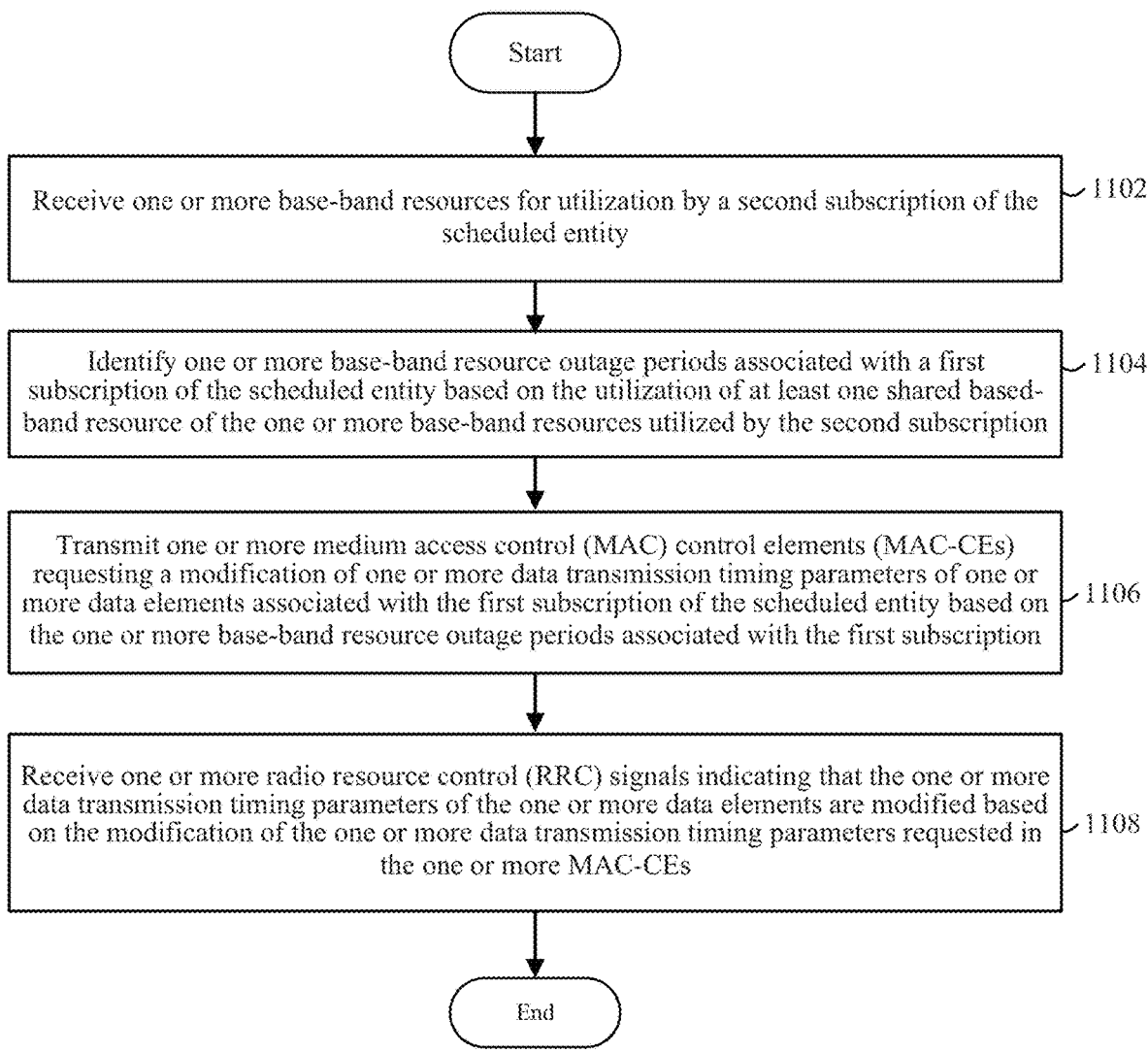
FIG. 11 is another flow chart of a method for transmitting indications of channel qualities for uplink and downlink transmission involving MSIM devices according to some aspects.

FIG. 11 is a flow chart 1100 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduled entity 900, as described herein, and illustrated in FIG. 9, by a processor or processing system, or by any suitable means for carrying out the described functions.

At block 1102, the scheduled entity 900 may receive one or more base-band resources for utilization by a second subscription of the scheduled entity 900. For example, the scheduled entity 900 may be a multi-subscriber identification module (MSIM) device having at least a first subscription and a second subscription. The first subscription may be associated with a digital data subscription (DDS) and the second subscription may be associated with a non-DDS. In some aspects, the non-DDS may include a voice subscription. The scheduled entity 900 may receive from a scheduling entity one or more base-band resource as data decoding resources for decoding data received by the scheduled entity 900 for utilization by the second subscription of the scheduled entity 900. The receiving circuitry 944 together with the transceiver 910, shown and described above in connection with FIG. 9 may provide a means to receive one or more base-band resources for utilization by a second subscription of the scheduled entity.

At block 1104, the scheduled entity 900 may identify one or more base-band resource outage periods associated with a first subscription based on a utilization of at least partially shared base-band resources by the second subscription. The features of block 1104 may include one or more same or similar features as the features described herein at least with respect to block 1002 of FIG. 10.

At block 1106, the scheduled entity 900 may transmit one or more medium access control (MAC) control elements (MAC-CEs) to a base station requesting a modification of one or more data transmission timing parameters of one or more data elements associated with the first subscription based on the one or more base-band resource outage periods associated with the first subscription. The features of block 1106 may include one or more same or similar features as the features described herein at least with respect to block 1004 of FIG. 10.

At block 1108, the scheduled entity 900 may receive one or more radio resource control (RRC) signals indicating that the one or more data transmission timing parameters of the one or more data elements are modified based on the modification of the one or more data transmission timing parameters requested in the one or more MAC-CEs. For example, the scheduled entity 900 may receive from the scheduling entity one or more radio resource control (RRC) signals indicating that the one or more data transmission timing parameters of the one or more SRSs are modified based on the modification of the one or more data transmission timing parameters requested in the one or more MAC-CEs. The scheduled entity 900 may subsequently transmit one or more SRSs on the uplink to the scheduling entity according to the modification of the one or more data transmission timing parameters requested in the one or more MAC-CEs. As another example, the scheduled entity 900 may receive from the scheduling entity one or more radio resource control (RRC) signals indicating that the one or more data transmission timing parameters of the one or more CSI-RSs are modified based on the modification of the one or more data transmission timing parameters requested in the one or more MAC-CEs. The scheduled entity 900 may subsequently receive one or more CSI-RSs on the downlink from the scheduling entity according to the modification of the one or more data transmission timing parameters requested in the one or more MAC-CEs. The receiving circuitry 944 together with the transceiver 910, shown and described above in connection with FIG. 9 may provide a means to receive one or more radio resource control (RRC) signals indicating that the one or more data transmission timing parameters of the one or more data elements are modified based on the modification of the one or more data transmission timing parameters requested in the one or more MAC-CEs.

In one configuration, the scheduled entity 900 includes means for performing the various functions and processes described in relation to FIG. 9. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1-3 and 6-8 and utilizing, for example, the processes and/or algorithms described herein in relation to FIG. 9.

Figure 12:
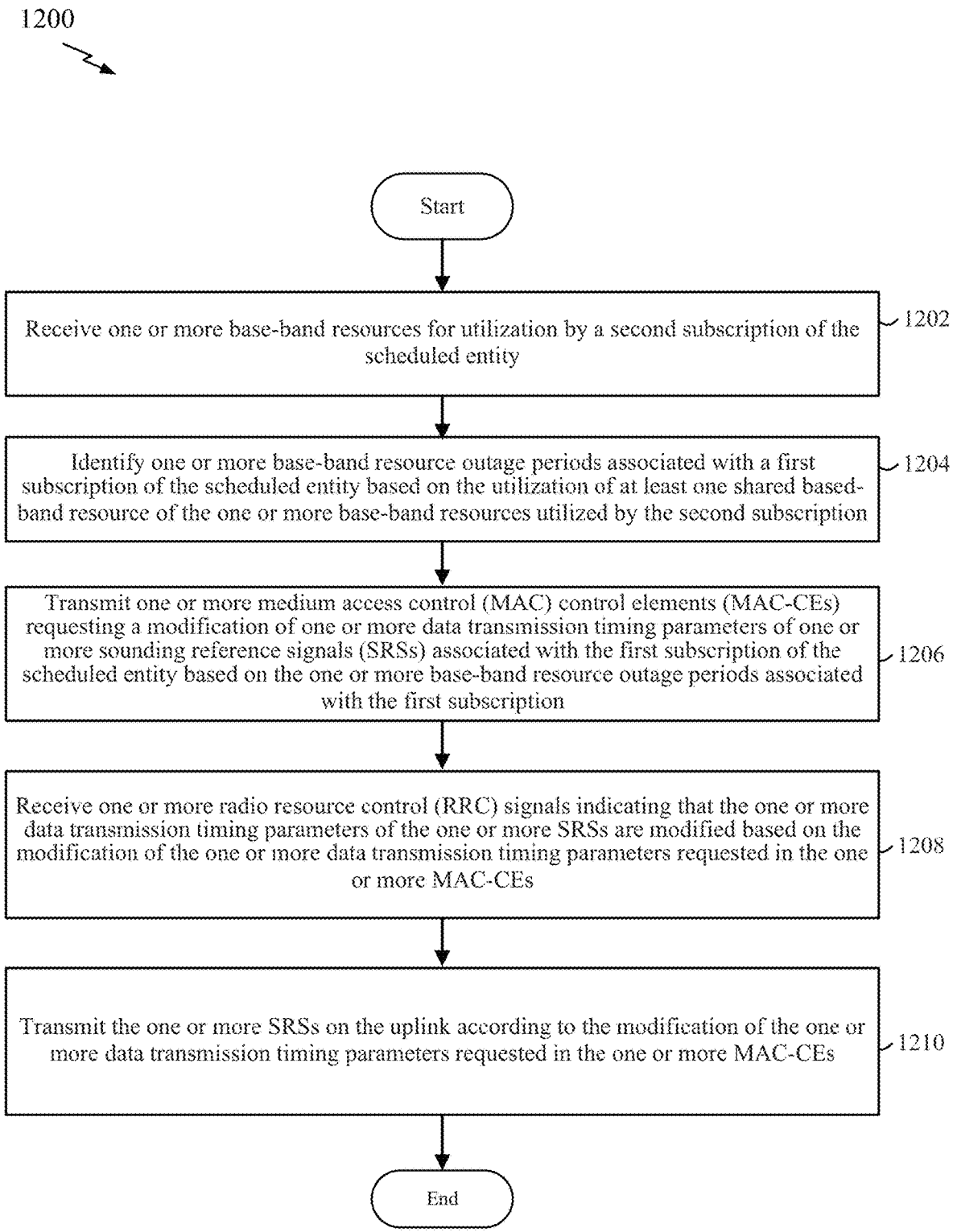
FIG. 12 is yet another flow chart of a method for transmitting indications of channel qualities for uplink and downlink transmission involving MSIM devices according to some aspects.

FIG. 12 is a flow chart 1200 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduled entity 900, as described herein, and illustrated in FIG. 9, by a processor or processing system, or by any suitable means for carrying out the described functions.

At block 1202, the scheduled entity 900 may receive one or more base-band resources for utilization by a second subscription of the scheduled entity 900. The features of block 1202 may include one or more same or similar features as the features described herein at least with respect to block 1002 of FIG. 10. At block 1204, the scheduled entity 900 may identify one or more base-band resource outage periods associated with a first subscription based on a utilization of at least partially shared base-band resources by the second subscription. The features of block 1204 may include one or more same or similar features as the features described herein at least with respect to block 1104 of FIG. 11.

At block 1206, the scheduled entity 900 may transmit one or more medium access control (MAC) control elements (MAC-CEs) to a base station requesting a modification of one or more data transmission timing parameters of one or more sounding reference signals (SRSs) associated with the first subscription based on the one or more base-band resource outage periods associated with the first subscription. The features of block 1206 may include one or more same or similar features as the features described herein at least with respect to block 1106 of FIG. 11. At block 1208, the scheduled entity 900 may receive one or more radio resource control (RRC) signals indicating that the one or more data transmission timing parameters of the one or more SRSs are modified based on the modification of the one or more data transmission timing parameters requested in the one or more MAC-CEs. The features of block 1008 may include one or more same or similar features as the features described herein at least with respect to block 908 of FIG. 9.

At block 1210, the scheduled entity 900 may transmit the SRS on the uplink according to the modification of the one or more data transmission timing parameters requested in the one or more MAC-CEs. For example, the scheduled entity 900 may receive from the scheduling entity one or more radio resource control (RRC) signals indicating that the one or more data transmission timing parameters of the one or more SRSs are modified based on the modification of the one or more data transmission timing parameters requested in the one or more MAC-CEs. The scheduled entity 900 may subsequently transmit one or more SRSs on the uplink to the scheduling entity according to the modification of the one or more data transmission timing parameters requested in the one or more MAC-CEs. The transmitting circuitry 942 together with the transceiver 910, shown and described above in connection with FIG. 9 may provide a means to transmit the SRS on the uplink according to the modification of the one or more data transmission timing parameters requested in the one or more MAC-CEs.

In one configuration, the scheduled entity 900 includes means for performing the various functions and processes described in relation to FIG. 10. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1-3 and 6-8 and utilizing, for example, the processes and/or algorithms described herein in relation to FIG. 12.

Figure 13:
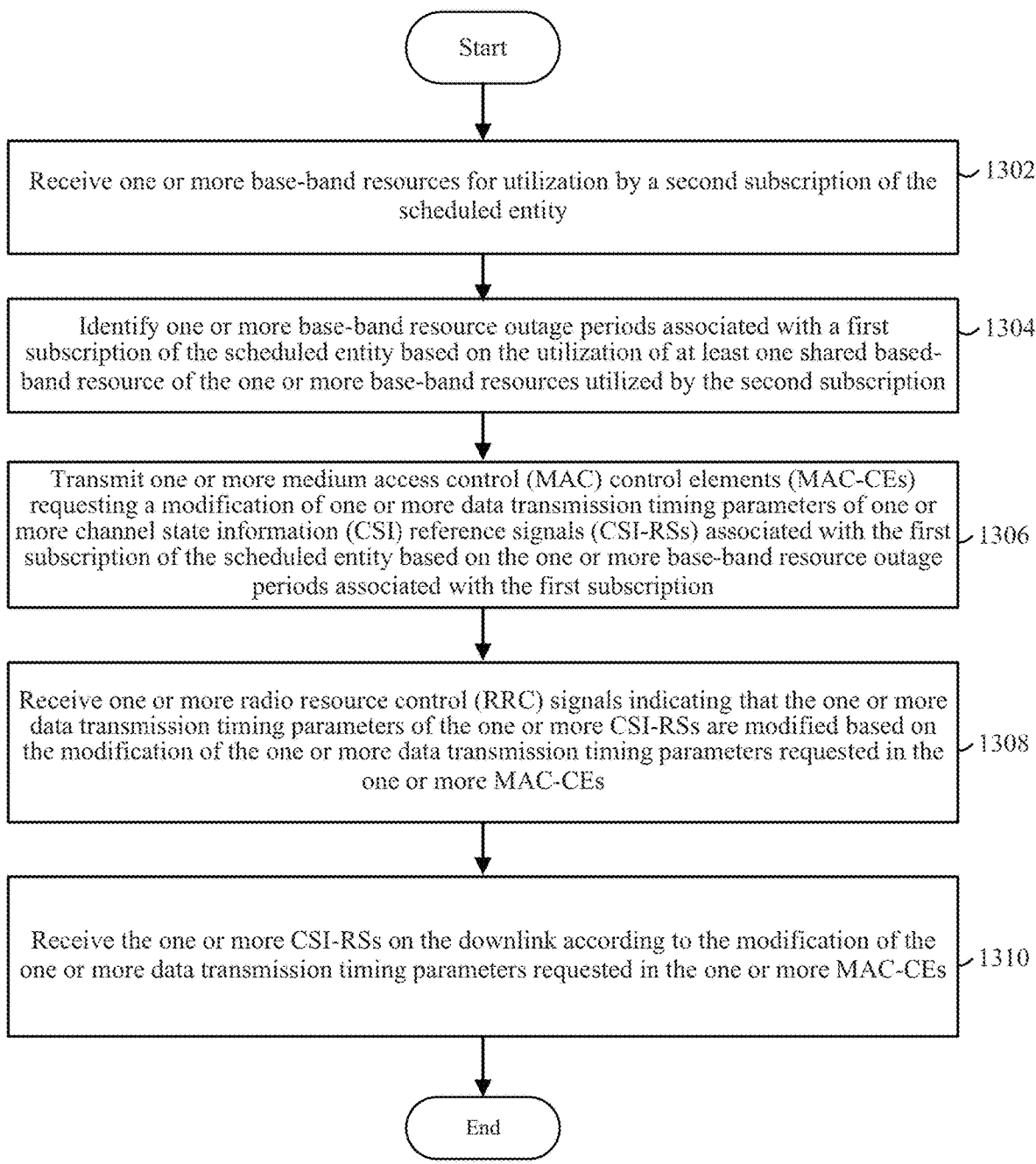
FIG. 13 is another flow chart of a method for transmitting indications of channel qualities for uplink and downlink transmission involving MSIM devices according to some aspects.

FIG. 13 is a flow chart 1300 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduled entity 900, as described herein, and illustrated in FIG. 9, by a processor or processing system, or by any suitable means for carrying out the described functions.

At block 1302, the scheduled entity 900 may receive one or more base-band resources for utilization by a second subscription of the scheduled entity 900. The features of block 1302 may include one or more same or similar features as the features described herein at least with respect to block 1102 of FIG. 11. At block 1304, the scheduled entity 900 may identify one or more base-band resource outage periods associated with a first subscription based on a utilization of at least partially shared base-band resources by the second subscription. The features of block 1304 may include one or more same or similar features as the features described herein at least with respect to block 1104 of FIG. 11.

At block 1306, the scheduled entity 900 may transmit one or more medium access control (MAC) control elements (MAC-CEs) to a base station requesting a modification of one or more data transmission timing parameters of one or more channel state information (CSI) reference signals (CSI-RSs) associated with the first subscription based on the one or more base-band resource outage periods associated with the first subscription. The features of block 1306 may include one or more same or similar features as the features described herein at least with respect to block 1106 of FIG. 11. At block 1308, the scheduled entity 900 may receive one or more radio resource control (RRC) signals indicating that the one or more data transmission timing parameters of the one or more CSI-RSs are modified based on the modification of the one or more data transmission timing parameters requested in the one or more MAC-CEs. The features of block 1308 may include one or more same or similar features as the features described herein at least with respect to block 1108 of FIG. 11.

At block 1310, the scheduled entity 900 may receive the one or more CSI-RSs on the uplink according to the modification of the one or more data transmission timing parameters requested in the one or more MAC-CEs. For example, the scheduled entity 900 may receive from the scheduling entity one or more radio resource control (RRC) signals indicating that the one or more data transmission timing parameters of the one or more CSI-RSs are modified based on the modification of the one or more data transmission timing parameters requested in the one or more MAC-CEs. The scheduled entity 900 may subsequently receive one or more CSI-RSs on the downlink from the scheduling entity according to the modification of the one or more data transmission timing parameters requested in the one or more MAC-CEs. The receiving circuitry 944 together with the transceiver 910, shown and described above in connection with FIG. 9 may provide a means to receive the one or more CSI-RSs on the uplink according to the modification of the one or more data transmission timing parameters requested in the one or more MAC-CEs.

In one configuration, the scheduled entity 900 includes means for performing the various functions and processes described in relation to FIG. 13. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1-3 and 6-8 and utilizing, for example, the processes and/or algorithms described herein in relation to FIG. 13.

Figure 14:
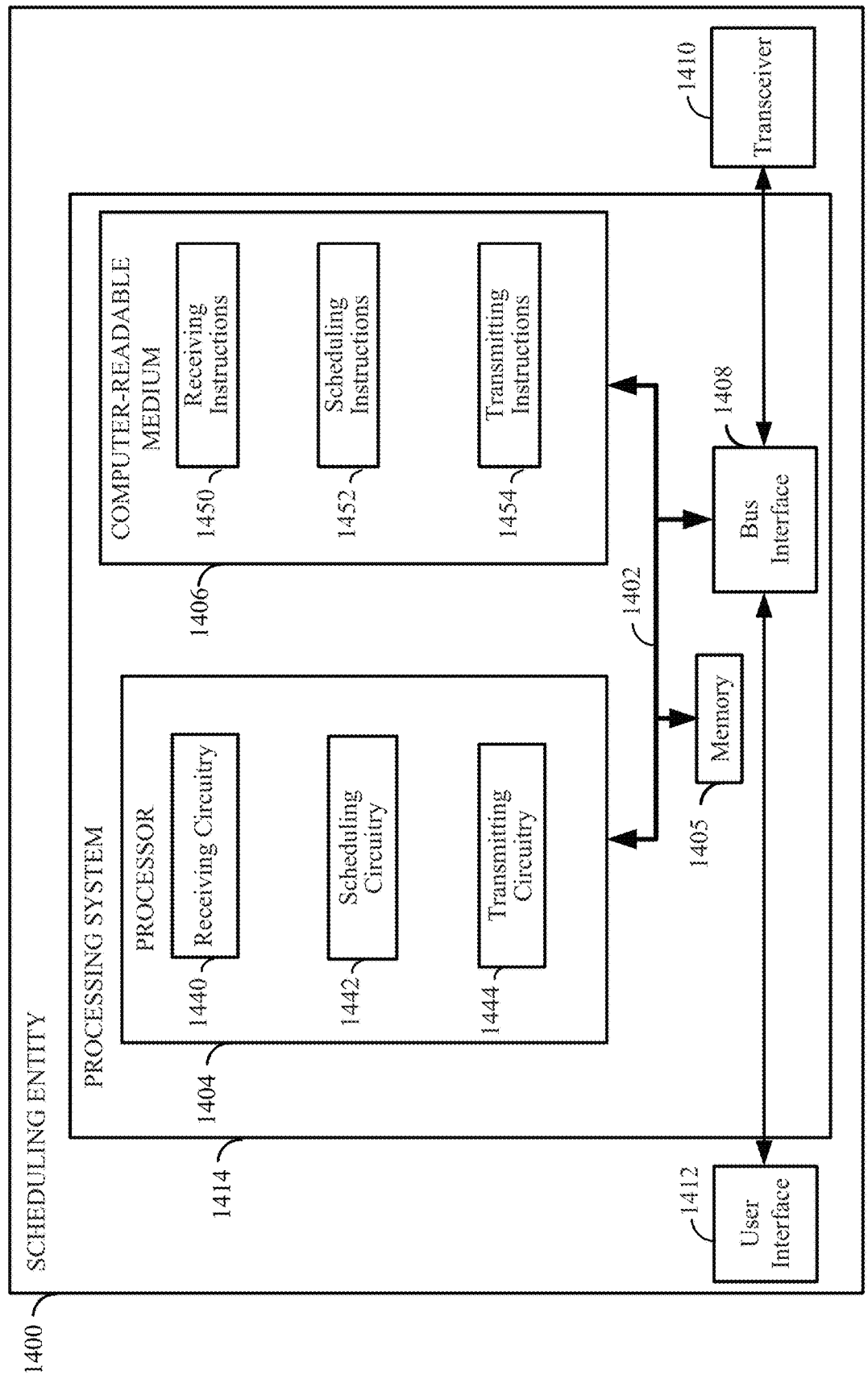
FIG. 14 is a block diagram illustrating an example of a hardware implementation for a scheduling entity employing a processing system according to some aspects.

FIG. 14 is a block diagram illustrating an example of a hardware implementation for a scheduling entity 1400 employing a processing system 1414 according to some aspects. For example, the scheduling entity 1400 may correspond to any of the UEs shown and described herein in any one or more of FIGS. 1-3 and 6-8.

In accordance with various aspects of the disclosure, an element, or any portion of an element, or any combination of elements may be implemented with a processing system 1414 that includes one or more processors 1404. The processing system 1414 may be substantially the same as the processing system 914 illustrated in FIG. 9, including a bus interface 1408, a bus 1402, a processor 1404, and a computer-readable storage medium 1406. Furthermore, the scheduling entity 1400 may include a user interface 1412 and a transceiver 1410 substantially similar to those described above in FIG. 9. That is, the processor 1404, as utilized in the scheduling entity 1400, may be used to implement any one or more of the processes described herein.

In some aspects of the disclosure, the processor 1404 may include circuitry configured for various functions. For example, the processor 1404 may include receiving circuitry 1440 configured to receive one or more medium access control (MAC) control elements (MAC-CEs) from scheduled entity requesting a modification of one or more data transmission timing parameters associated with a first subscription based on one or more base-band resource outage periods associated with the first subscription. The receiving circuitry 1440 may also be configured to receive the SRS on the uplink according to the modification of the one or more data transmission timing parameters requested in the one or more MAC-CEs. The receiving circuitry 1440 may be configured to execute receiving instructions 1450 stored in the computer-readable storage medium 1406 to implement any of the one or more of the functions described herein.

The processor 1404 may also include scheduling circuitry 1442 configured to schedule a transmission of one or more data elements between a scheduled entity and the scheduling entity 1400 based on the modification of the one or more data transmission timing parameters requested in the one or more MAC-CEs. The scheduling circuitry 1442 may be configured to execute scheduling instructions 1452 stored in the computer-readable storage medium 1406 to implement any of the one or more of the functions described herein.

The processor 1404 may further include transmitting circuitry 1444 configured to transmit one or more radio resource control (RRC) signals indicating that the one or more data transmission timing parameters of the one or more data elements are scheduled based on the modification of the one or more data transmission timing parameters requested in the one or more MAC-CEs. The transmitting circuitry 1444 may also be configured to transmit one or more CSI-RSs on the downlink according to the modification of the one or more data transmission timing parameters requested in the one or more MAC-CEs. The transmitting circuitry 1444 may be configured to execute transmitting instructions 1454 stored in the computer-readable storage medium 1406 to implement any of the one or more of the functions described herein.

In addition, the processor 1404 may include transmitting circuitry 1446 configured to transmit the one or more CSF parameters to the first network entity. The transmitting circuitry 1446 may also be configured to transmit an indication of the one or more beams for beamforming based on the one or more beam coefficients to at least the first network entity. The transmitting circuitry 1446 may be configured to execute transmitting instructions 1456 stored in the computer-readable storage medium 1406 to implement any of the one or more of the functions described herein.

Figure 15:
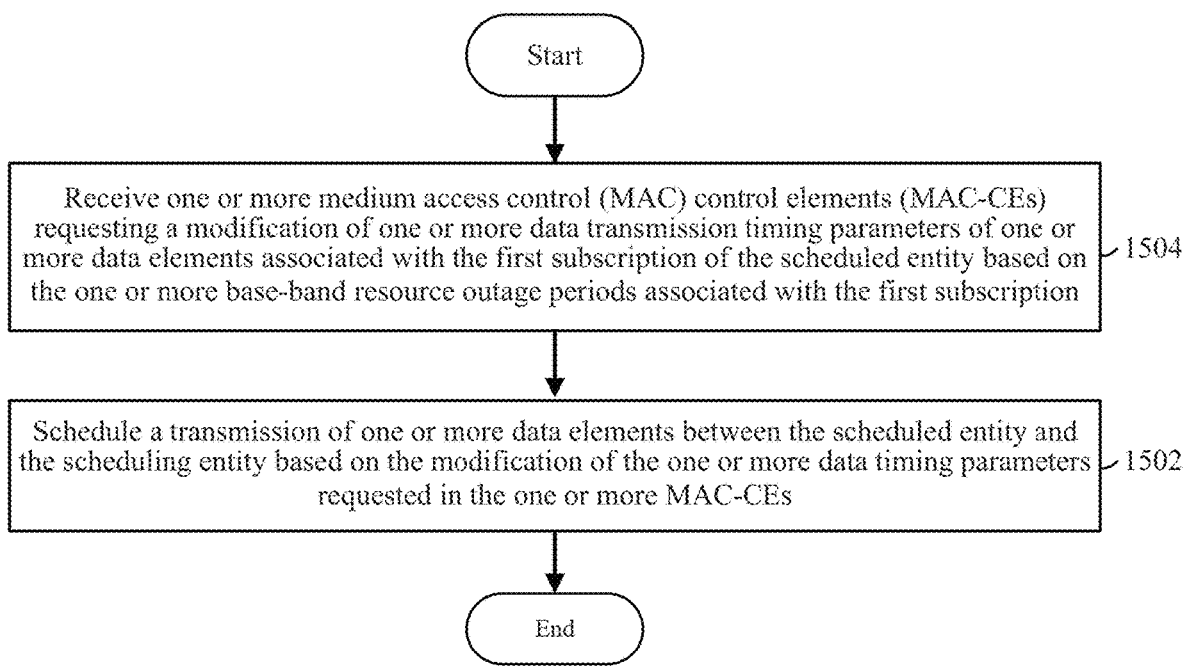
FIG. 15 is a flow chart of a method for transmitting indications of channel qualities for uplink and downlink transmission involving MSIM devices according to some aspects.

FIG. 15 is a flow chart 1500 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduling entity 1400, as described herein, and illustrated in FIG. 14, by a processor or processing system, or by any suitable means for carrying out the described functions.

At block 1502, the scheduling entity 1400 may receive one or more medium access control (MAC) control elements (MAC-CEs) from a user equipment (UE) requesting a modification of one or more data transmission timing parameters associated with a first subscription based on one or more base-band resource outage periods associated with the first subscription. In some aspects, the one or more data elements may include at least a sounding reference signal (SRS) for an uplink. For example, the scheduled entity 804 may transmit for reception by the scheduling entity 802 one or more medium access control (MAC) control elements (MAC-CEs) requesting a modification of one or more data transmission timing parameters of one or more SRSs associated with the first subscription based on the one or more base-band resource outage periods associated with the first subscription. In some aspects, the one or more data transmission timing parameters comprise at least an SRS-PeriodicityAndOffset value for avoiding a collision between the base-band resources utilized by the second subscription and the SRS for the uplink. In some aspects, the one or more data elements comprise at least a channel state information (CSI) reference signal (CSI-RS) for a downlink. For example, the scheduled entity 804 may transmit for reception by the scheduling entity 802 one or more medium access control (MAC) control elements (MAC-CEs) requesting a modification of one or more data transmission timing parameters of one or more CSI-RSs associated with the first subscription based on the one or more base-band resource outage periods associated with the first subscription. In some aspects, the one or more data transmission timing parameters comprise at least an CSI-ReportPeriodicityAndOffset value for avoiding a collision between the base-band resources utilized by the second subscription and the CSI-RS for the downlink.

The receiving circuitry 1440 together with the transceiver 1410, shown and described above in connection with FIG. 14 may provide a means to receive one or more medium access control (MAC) control elements (MAC-CEs) from a user equipment (UE) requesting a modification of one or more data transmission timing parameters associated with a first subscription based on one or more base-band resource outage periods associated with the first subscription.

At block 1504, the scheduling entity 1400 may schedule a transmission of one or more data elements between the scheduled entity and the scheduling entity 1400 based on the modification of the one or more data transmission timing parameters requested in the one or more MAC-CEs. For example, the scheduling entity 1400 may receive an uplink MAC-CE and schedule a transmission of one or more subsequent data elements between the scheduled entity and the scheduling entity 1400 based on the modification of the one or more data transmission timing parameters requested in the uplink MAC-CE. The scheduling entity 1400 may schedule a first subsequent data element so that the first subsequent data element is not to be transmitted during a first subsequent outage time period and instead is time adjusted or modified for transmission during a first subsequent non-outage time period for successful transmission with the scheduling entity 1400. Similarly, the scheduling entity 1400 may schedule a second subsequent data element so that the second subsequent data element is not to be transmitted during a second subsequent outage time period and instead is time adjusted or modified for transmission during a second subsequent non-outage time period for successful transmission with the scheduling entity 1400. The scheduling circuitry 1442, shown and described above in connection with FIG. 14 may provide a means to schedule a transmission of one or more data elements between the scheduled entity and the scheduling entity 1400 based on the modification of the one or more data transmission timing parameters requested in the one or more MAC-CEs.

In one configuration, the scheduling entity 1400 includes means for performing the various functions and processes described in relation to FIG. 15. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-3 and 6-8 and utilizing, for example, the processes and/or algorithms described herein in relation to FIG. 15.

Figure 16:
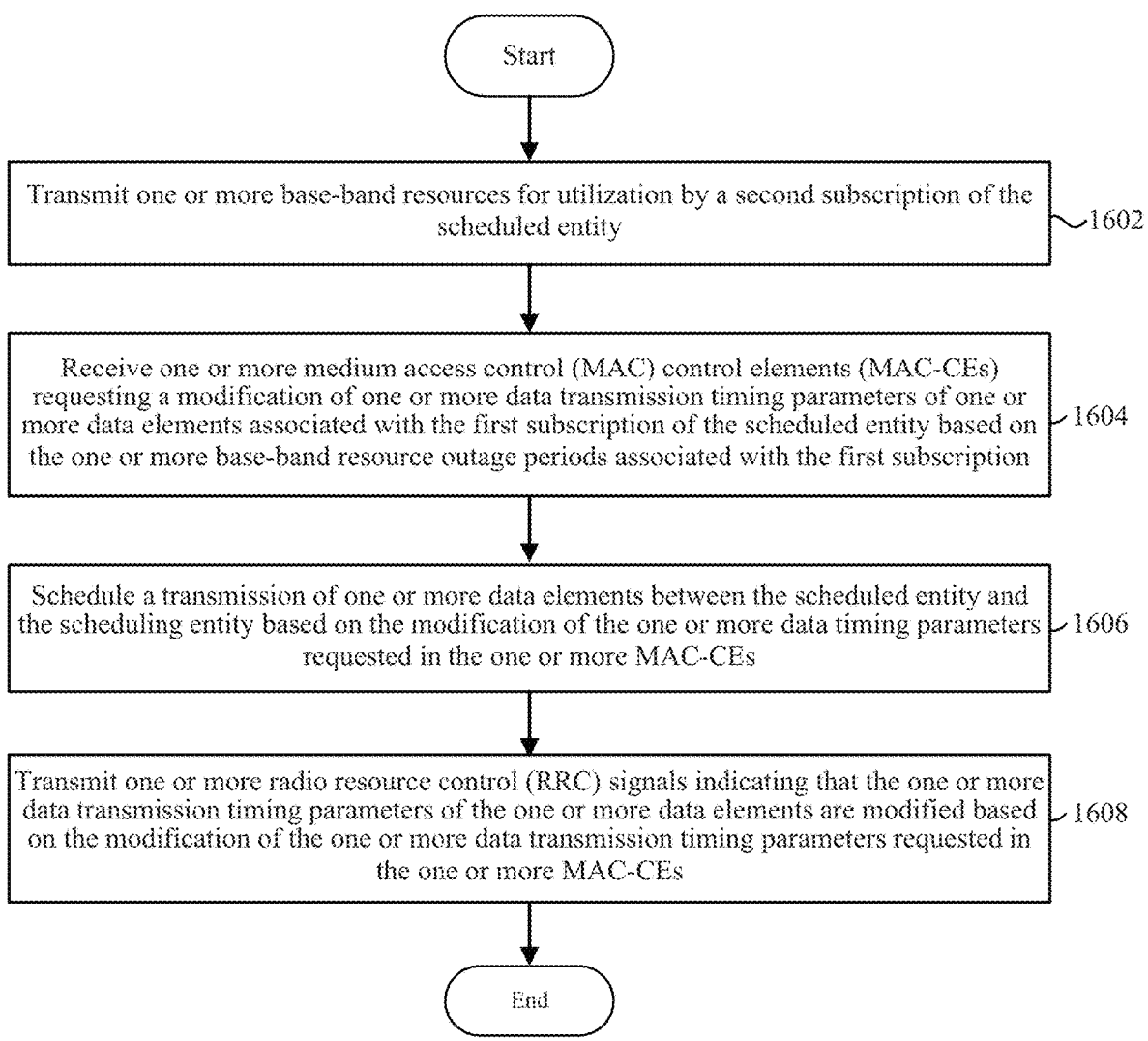
FIG. 16 is another flow chart of a method for transmitting indications of channel qualities for uplink and downlink transmission involving MSIM devices according to some aspects.

FIG. 16 is a flow chart 1600 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduling entity 1400, as described herein, and illustrated in FIG. 14, by a processor or processing system, or by any suitable means for carrying out the described functions.

At block 1602, the scheduling entity 1400 may transmit one or more radio resource control (RRC) signals indicating that the one or more data transmission timing parameters of the one or more data elements are scheduled based on the modification of the one or more data transmission timing parameters requested in the one or more MAC-CEs. For example, the scheduled entity may be a multi-subscriber identification module (MSIM) device having at least a first subscription and a second subscription. The first subscription may be associated with a digital data subscription (DDS) and the second subscription may be associated with a non-DDS. In some aspects, the non-DDS may include a voice subscription. The scheduling entity 1400 may transmit to the scheduled entity one or more base-band resource as data decoding resources for decoding data received by the scheduled entity for utilization by the second subscription of the scheduled entity. The transmitting circuitry 1444 together with the transceiver 1410, shown and described above in connection with FIG. 14 may provide a means to transmit one or more radio resource control (RRC) signals indicating that the one or more data transmission timing parameters of the one or more data elements are scheduled based on the modification of the one or more data transmission timing parameters requested in the one or more MAC-CEs.

At block 1604, the scheduling entity 1400 may receive one or more medium access control (MAC) control elements (MAC-CEs) from a user equipment (UE) requesting a modification of one or more data transmission timing parameters associated with a first subscription based on one or more base-band resource outage periods associated with the first subscription. The features of block 1604 may include one or more same or similar features as the features described herein at least with respect to block 1502 of FIG. 15.

At block 1606, the scheduling entity 1400 may schedule a transmission of one or more data elements between the scheduled entity and the scheduling entity 1400 based on the modification of the one or more data transmission timing parameters requested in the one or more MAC-CEs. The features of block 1606 may include one or more same or similar features as the features described herein at least with respect to block 1504 of FIG. 15.

At block 1608, the scheduling entity 1400 may transmit one or more radio resource control (RRC) signals indicating that the one or more data transmission timing parameters of the one or more data elements are modified based on the modification of the one or more data transmission timing parameters requested in the one or more MAC-CEs. For example, the scheduling entity 1400 may transmit to the scheduled entity one or more radio resource control (RRC) signals indicating that the one or more data transmission timing parameters of the one or more SRSs are modified based on the modification of the one or more data transmission timing parameters requested in the one or more MAC-CEs. The scheduling entity 1400 may subsequently receive one or more SRSs on the uplink from the scheduled entity according to the modification of the one or more data transmission timing parameters requested in the one or more MAC-CEs. As another example, the scheduling entity 1400 may transmit to the scheduled entity one or more radio resource control (RRC) signals indicating that the one or more data transmission timing parameters of the one or more CSI-RSs are modified based on the modification of the one or more data transmission timing parameters requested in the one or more MAC-CEs. The scheduling entity 1400 may subsequently transmit one or more CSI-RSs on the downlink to the scheduled entity according to the modification of the one or more data transmission timing parameters requested in the one or more MAC-CEs. The transmitting circuitry 1444 together with the transceiver 1410, shown and described above in connection with FIG. 14 may provide a means to transmit one or more radio resource control (RRC) signals indicating that the one or more data transmission timing parameters of the one or more data elements are modified based on the modification of the one or more data transmission timing parameters requested in the one or more MAC-CEs.

In one configuration, the scheduling entity 1400 includes means for performing the various functions and processes described in relation to FIG. 14. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-3 and 6-8 and utilizing, for example, the processes and/or algorithms described herein in relation to FIG. 16.

Figure 17:
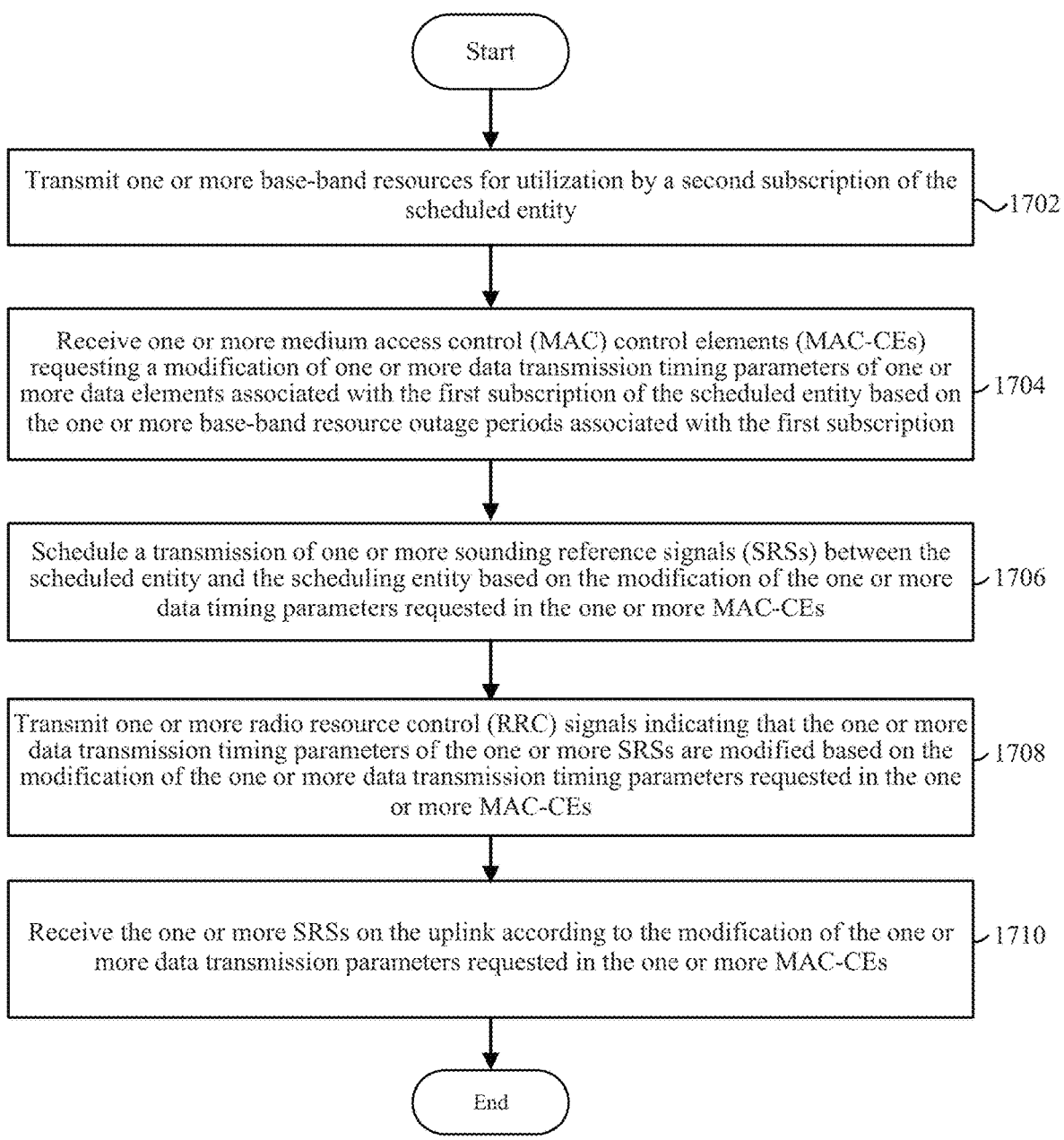
FIG. 17 is yet another flow chart of a method for transmitting indications of channel qualities for uplink and downlink transmission involving MSIM devices according to some aspects.

FIG. 17 is a flow chart 1700 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduling entity 1400, as described herein, and illustrated in FIG. 14, by a processor or processing system, or by any suitable means for carrying out the described functions.

At block 1702, the scheduling entity 1400 may transmit one or more base-band resources for utilization by a second subscription of a scheduled entity. The features of block 1702 may include one or more same or similar features as the features described herein at least with respect to block 1602 of FIG. 16.

At block 1704, the scheduling entity 1400 may receive one or more medium access control (MAC) control elements (MAC-CEs) from a user equipment (UE) requesting a modification of one or more data transmission timing parameters associated with a first subscription based on one or more base-band resource outage periods associated with the first subscription. The features of block 1704 may include one or more same or similar features as the features described herein at least with respect to block 1502 of FIG. 15.

At block 1706, the scheduling entity 1400 may schedule a transmission of one or more sounding reference signals (SRSs) between the scheduled entity and the scheduling entity 1400 based on the modification of the one or more data transmission timing parameters requested in the one or more MAC-CEs. The features of block 1706 may include one or more same or similar features as the features described herein at least with respect to block 1504 of FIG. 15.

At block 1708, the scheduling entity 1400 may transmit one or more radio resource control (RRC) signals indicating that the one or more data transmission timing parameters of the one or more SRSs are modified based on the modification of the one or more data transmission timing parameters requested in the one or more MAC-CEs. The features of block 1708 may include one or more same or similar features as the features described herein at least with respect to block 1608 of FIG. 16.

At block 1710, the scheduling entity 1400 may receive one or more SRSs on the uplink according to the modification of the one or more data transmission timing parameters requested in the one or more MAC-CEs. For example, the scheduling entity 1400 may transmit to the scheduled entity one or more radio resource control (RRC) signals indicating that the one or more data transmission timing parameters of the one or more SRSs are modified based on the modification of the one or more data transmission timing parameters requested in the one or more MAC-CEs. The scheduling entity 1400 may subsequently receive one or more SRSs on the uplink from the scheduled entity according to the modification of the one or more data transmission timing parameters requested in the one or more MAC-CEs. The receiving circuitry 1440 together with the transceiver 1410, shown and described above in connection with FIG. 14 may provide a means to receive one or more SRSs on the uplink according to the modification of the one or more data transmission timing parameters requested in the one or more MAC-CEs.

In one configuration, the scheduling entity 1400 includes means for performing the various functions and processes described in relation to FIG. 17. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-3 and 6-8 and utilizing, for example, the processes and/or algorithms described herein in relation to FIG. 17.

Figure 18:
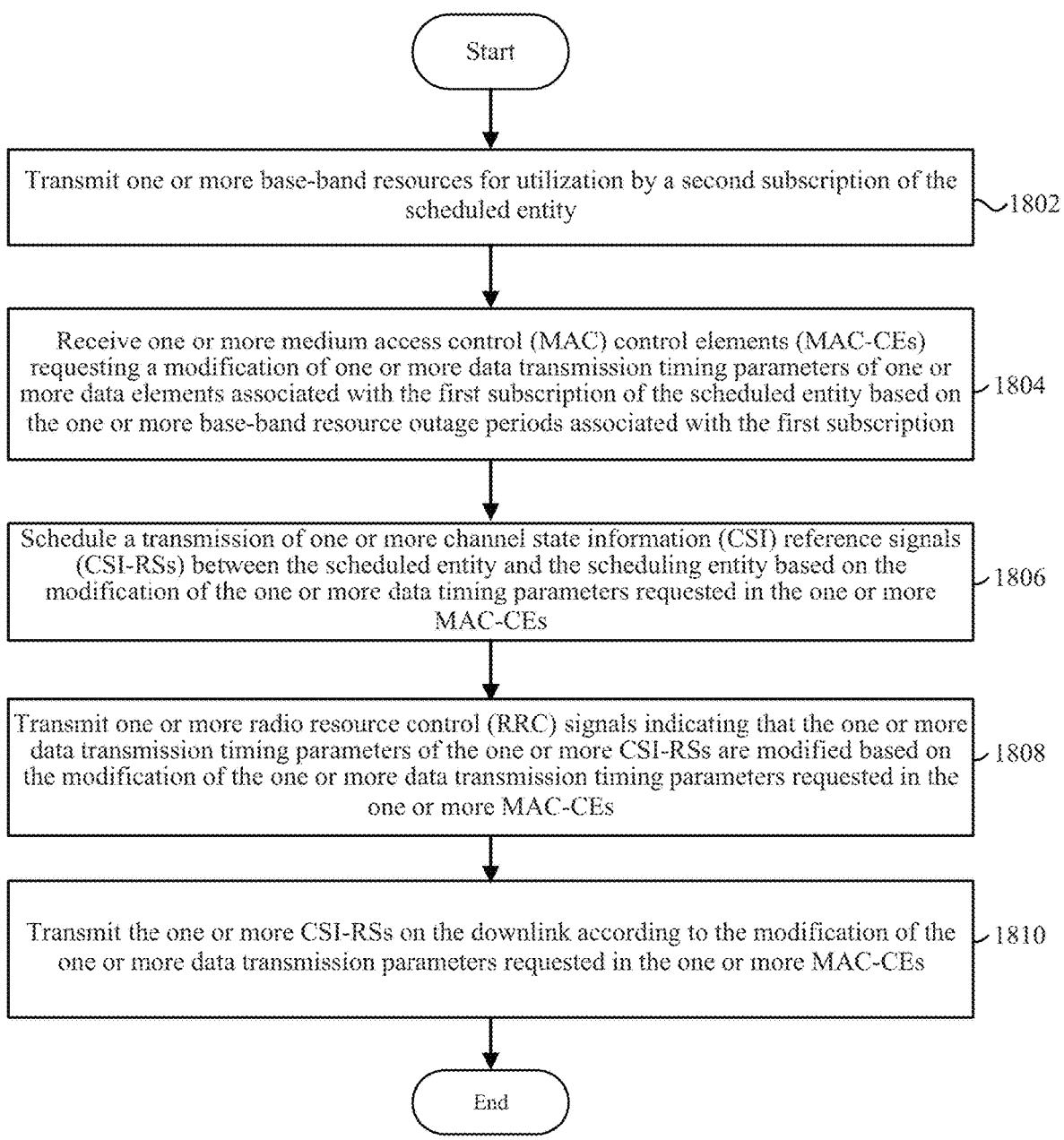
FIG. 18 is another flow chart of a method for transmitting indications of channel qualities for uplink and downlink transmission involving MSIM devices according to some aspects.

FIG. 18 is a flow chart 1800 of a method for transmitting indications of channel qualities for uplink and downlink transmission involving multi-subscriber identification module (MSIM) devices according to some aspects. As described below, some or all illustrated features may be omitted in a particular implementation within the scope of the present disclosure, and some illustrated features may not be required for implementation of all aspects. In some examples, the method may be performed by the scheduling entity 1400, as described herein, and illustrated in FIG. 14, by a processor or processing system, or by any suitable means for carrying out the described functions.

At block 1802, the scheduling entity 1400 may transmit one or more base-band resources for utilization by a second subscription of a scheduled entity. The features of block 1802 may include one or more same or similar features as the features described herein at least with respect to block 1602 of FIG. 16.

At block 1804, the scheduling entity 1400 may receive one or more medium access control (MAC) control elements (MAC-CEs) from a user equipment (UE) requesting a modification of one or more data transmission timing parameters associated with a first subscription based on one or more base-band resource outage periods associated with the first subscription. The features of block 1804 may include one or more same or similar features as the features described herein at least with respect to block 1502 of FIG. 15.

At block 1806, the scheduling entity 1400 may schedule a transmission of one or more channel state information (CSI) reference signals (CSI-RSs) between the scheduled entity and the scheduling entity 1400 based on the modification of the one or more data transmission timing parameters requested in the one or more MAC-CEs. The features of block 1806 may include one or more same or similar features as the features described herein at least with respect to block 1504 of FIG. 15.

At block 1808, the scheduling entity 1400 may transmit one or more radio resource control (RRC) signals indicating that the one or more data transmission timing parameters of the one or more CSI-RSs are modified based on the modification of the one or more data transmission timing parameters requested in the one or more MAC-CEs. The features of block 1808 may include one or more same or similar features as the features described herein at least with respect to block 1608 of FIG. 16.

At block 1810, the scheduling entity 1400 may transmit one or more CSI-RSs on the downlink according to the modification of the one or more data transmission timing parameters requested in the one or more MAC-CEs. For example, the scheduling entity 1400 may transmit to the scheduled entity one or more radio resource control (RRC) signals indicating that the one or more data transmission timing parameters of the one or more CSI-RSs are modified based on the modification of the one or more data transmission timing parameters requested in the one or more MAC-CEs. The scheduling entity 1400 may subsequently transmit one or more CSI-RSs on the downlink to the scheduled entity according to the modification of the one or more data transmission timing parameters requested in the one or more MAC-CEs. The transmitting circuitry 1444 together with the transceiver 1410, shown and described above in connection with FIG. 14 may provide a means to transmit one or more CSI-RSs on the downlink according to the modification of the one or more data transmission timing parameters requested in the one or more MAC-CEs.

In one configuration, the scheduling entity 1400 includes means for performing the various functions and processes described in relation to FIG. 18. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-3 and 6-8 and utilizing, for example, the processes and/or algorithms described herein in relation to FIG. 18.

In a first aspect, a user equipment (UE) for wireless communication having a first subscription and a second subscription may identify one or more base-band resource outage periods associated with the first subscription based on a utilization of at least partially shared base-band resources by the second subscription. The UE may also transmit one or more medium access control (MAC) control elements (MAC-CEs) to a base station requesting a modification of one or more data transmission timing parameters of one or more data elements associated with the first subscription based on the one or more base-band resource outage periods associated with the first subscription.

In a second aspect, alone or in combination with the first aspect, the first subscription may be associated with a digital data subscription (DDS) and the second subscription is associated with a non-DDS.

In a third aspect, alone or in combination with one or more of the first and second aspects, the non-DDS may include a voice subscription.

In a fourth aspect, alone or in combination with one or more of the first through third aspects, the base-band resources may include data decoding resources.

In a fifth aspect, alone or in combination with one or more of the first through fourth aspects, the one or more data elements may include at least one of a sounding reference signal (SRS) for an uplink or a channel state information (CSI) references signal (CSI-RS) for a downlink.

In a sixth aspect, alone or in combination with one or more of the first through fifth aspects, the one or more data elements comprise at least a sounding reference signal (SRS) for an uplink.

In a seventh aspect, alone or in combination with one or more of the first through sixth aspects, the one or more data transmission timing parameters comprise at least an SRS-PeriodicityAndOffset value for avoiding a collision between the base-band resources utilized by the second subscription and the SRS for the uplink.

In an eighth aspect, alone or in combination with one or more of the first through seventh aspects, the UE may further receive one or more radio resource control (RRC) signals indicating that the one or more data transmission timing parameters of the one or more data elements are modified based on the modification of the one or more data transmission timing parameters requested in the one or more MAC-CEs.

In a ninth aspect, alone or in combination with one or more of the first through eighth aspects, the UE may further transmit the SRS on the uplink according to the modification of the one or more data transmission timing parameters requested in the one or more MAC-CEs.

In a tenth aspect, alone or in combination with one or more of the first through ninth aspects, identifying the one or more base-band resource outage periods associated with the first subscription based on the utilization of the base-band resources by the second subscription may include detecting a collision between the base-band resources utilized by the second subscription and the SRS on the uplink.

In an eleventh aspect, alone or in combination with one or more of the first through tenth aspects, the one or more data elements may include at least a channel state information (CSI) reference signal (CSI-RS) for a downlink.

In a twelfth aspect, alone or in combination with one or more of the first through eleventh aspects, the one or more data transmission timing parameters may include at least an CSI-ReportPeriodicityAndOffset value for avoiding a collision between the base-band resources utilized by the second subscription and the CSI-RS for the downlink.

In a thirteenth aspect, alone or in combination with one or more of the first through twelfth aspects, the UE may further receive one or more radio resource control (RRC) signals indicating that the one or more data transmission timing parameters of the one or more data elements are modified based on the modification of the one or more data transmission timing parameters requested in the one or more MAC-CEs.

In a fourteenth aspect, alone or in combination with one or more of the first through thirteenth aspects, the UE may further receive the CSI-RS on the downlink according to the modification of the one or more data transmission timing parameters requested in the one or more MAC-CEs.

In a fifteenth aspect, alone or in combination with one or more of the first through fourteenth aspects, identifying the one or more base-band resource outage periods associated with the first subscription based on the utilization of the base-band resources by the second subscription may include detecting a collision between the base-band resources utilized by the second subscription and the CSI-RS on the downlink.

In a sixteenth aspect, a base station may receive one or more medium access control (MAC) control elements (MAC-CEs) from a user equipment (UE) requesting a modification of one or more data transmission timing parameters associated with a first subscription based on one or more base-band resource outage periods associated with the first subscription. The base station may also schedule a transmission of one or more data elements between the UE and the base station based on the modification of the one or more data transmission timing parameters requested in the one or more MAC-CEs.

In a seventeenth aspect, alone or in combination with the sixteenth aspect, the first subscription may be associated with a digital data subscription (DDS).

In an eighteenth aspect, alone or in combination with one or more of the sixteenth through seventeenth aspects, the one or more data elements may include at least one of a sounding reference signal (SRS) for an uplink or a channel state information (CSI) references signal (CSI-RS) for a downlink.

In a nineteenth aspect, alone or in combination with one or more of the sixteenth through eighteenth aspects, the one or more data elements may include at least a sounding reference signal (SRS) for an uplink.

In a twentieth aspect, alone or in combination with one or more of the sixteenth through nineteenth aspects, the one or more data transmission timing parameters may include at least an SRS-PeriodicityAndOffset value for avoiding a collision between base-band resources utilized by a second subscription of the UE and the SRS for the uplink.

In a twenty-first aspect, alone or in combination with one or more of the fifteenth through twentieth aspects, the base station may further transmit one or more radio resource control (RRC) signals indicating that the one or more data transmission timing parameters of the one or more data elements are scheduled based on the modification of the one or more data transmission timing parameters requested in the one or more MAC-CEs.

In a twenty-second aspect, alone or in combination with one or more of the sixteenth through twenty-first aspect, the base station may further receive the SRS on the uplink according to the modification of the one or more data transmission timing parameters requested in the one or more MAC-CEs.

In a twenty-third aspect, alone or in combination with one or more of the sixteenth through twenty-second aspect, the one or more data elements may include at least a channel state information (CSI) reference signal (CSI-RS) for a downlink.

In a twenty-fourth aspect, alone or in combination with one or more of the sixteenth through twenty-third aspect, the one or more data transmission timing parameters comprise at least an CSI-ReportPeriodicityAndOffset value for avoiding a collision between the base-band resources utilized by a second subscription of the UE and the CSI-RS for the downlink.

In a twenty-fifth aspect, alone or in combination with one or more of the sixteenth through twenty-fourth aspect, the base station may further transmit one or more radio resource control (RRC) signals indicating that the one or more data transmission timing parameters of the one or more data elements are scheduled based on the modification of the one or more data transmission timing parameters requested in the one or more MAC-CEs.

In a twenty-sixth aspect, alone or in combination with one or more of the sixteenth through twenty-fifth aspect, the base station may further transmit the CSI-RS on the downlink according to the modification of the one or more data transmission timing parameters requested in the one or more MAC-CEs.

In one configuration, a user equipment (UE) may include means for receiving one or more base-band resources for utilization by a second subscription of the UE, means for identifying one or more base-band resource outage periods associated with the first subscription based on a utilization of at least partially shared base-band resources by the second subscription, means for transmitting one or more medium access control (MAC) control elements (MAC-CEs) to a base station requesting a modification of one or more data transmission timing parameters of one or more data elements associated with the first subscription based on the one or more base-band resource outage periods associated with the first subscription, and means receiving one or more radio resource control (RRC) signals indicating that the one or more data transmission timing parameters of the one or more data elements are modified based on the modification of the one or more data transmission timing parameters requested in the one or more MAC-CEs.

In one aspect, the aforementioned means for receiving one or more base-band resources for utilization by a second subscription of the UE, means for identifying one or more base-band resource outage periods associated with the first subscription based on a utilization of at least partially shared base-band resources by the second subscription, means for transmitting one or more medium access control (MAC) control elements (MAC-CEs) to a base station requesting a modification of one or more data transmission timing parameters of one or more data elements associated with the first subscription based on the one or more base-band resource outage periods associated with the first subscription, and means receiving one or more radio resource control (RRC) signals indicating that the one or more data transmission timing parameters of the one or more data elements are modified based on the modification of the one or more data transmission timing parameters requested in the one or more MAC-CEs may be the processor(s) 904 shown in FIG. 9 configured to perform the functions recited by the aforementioned means. For example, the aforementioned means for receiving one or more base-band resources for utilization by a second subscription of the UE may include the receiving circuitry 944 together with the transceiver 910 shown in FIG. 9. As another example, the aforementioned means for identifying one or more base-band resource outage periods associated with the first subscription based on a utilization of at least partially shared base-band resources by the second subscription may include the identifying circuitry 940 shown in FIG. 9. As yet another example, the aforementioned means for transmitting one or more medium access control (MAC) control elements (MAC-CEs) to a base station requesting a modification of one or more data transmission timing parameters of one or more data elements associated with the first subscription based on the one or more base-band resource outage periods associated with the first subscription may include the transmitting circuitry 942 and transceiver 910 shown in FIG. 9. As another example, the aforementioned means for receiving one or more radio resource control (RRC) signals indicating that the one or more data transmission timing parameters of the one or more data elements are modified based on the modification of the one or more data transmission timing parameters requested in the one or more MAC-CEs may include the receiving circuitry 944 and transceiver 910 shown in FIG. 9. In another aspect, the aforementioned means may be a circuit or any apparatus configured to perform the functions recited by the aforementioned means.

In one configuration, a base station may include means for transmitting one or more base-band resources for utilization by a second subscription of a user equipment (UE), means for receiving one or more medium access control (MAC) control elements (MAC-CEs) from the UE requesting a modification of one or more data transmission timing parameters associated with a first subscription based on one or more base-band resource outage periods associated with the first subscription, means for scheduling a transmission of one or more data elements between the UE and the base station based on the modification of the one or more data transmission timing parameters requested in the one or more MAC-CEs, and means for transmitting one or more radio resource control (RRC) signals indicating that the one or more data transmission timing parameters of the one or more data elements are scheduled based on the modification of the one or more data transmission timing parameters requested in the one or more MAC-CEs.

In one aspect, the aforementioned means for transmitting one or more base-band resources for utilization by a second subscription of a user equipment (UE), means for receiving one or more medium access control (MAC) control elements (MAC-CEs) from the UE requesting a modification of one or more data transmission timing parameters associated with a first subscription based on one or more base-band resource outage periods associated with the first subscription, means for scheduling a transmission of one or more data elements between the UE and the base station based on the modification of the one or more data transmission timing parameters requested in the one or more MAC-CEs, and means for transmitting one or more radio resource control (RRC) signals indicating that the one or more data transmission timing parameters of the one or more data elements are scheduled based on the modification of the one or more data transmission timing parameters requested in the one or more MAC-CEs may be the processor(s) 1404 shown in FIG. 14 configured to perform the functions recited by the aforementioned means. For example, the aforementioned means for transmitting one or more base-band resources for utilization by a second subscription of a user equipment (UE) may include the transmitting circuitry 1444 and transceiver 1410 shown in FIG. 14. As another example, the aforementioned means for receiving one or more medium access control (MAC) control elements (MAC-CEs) from the UE requesting a modification of one or more data transmission timing parameters associated with a first subscription based on one or more base-band resource outage periods associated with the first subscription may include the receiving circuitry 1440 together with the transceiver 1410 shown in FIG. 14. As yet another example, the aforementioned means for scheduling a transmission of one or more data elements between the UE and the base station based on the modification of the one or more data transmission timing parameters requested in the one or more MAC-CEs may include the scheduling circuitry 1442 shown in FIG. 14. As another example, the aforementioned means for transmitting one or more radio resource control (RRC) signals indicating that the one or more data transmission timing parameters of the one or more data elements are scheduled based on the modification of the one or more data transmission timing parameters requested in the one or more MAC-CEs may include the transmitting circuitry 1444 together with the transceiver 1410 shown in FIG. 14. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) having a first subscription and a second subscription, comprising:
    identifying one or more base-band resource outage periods associated with the first subscription based on a utilization of at least partially shared base-band resources by the second subscription;
    transmitting one or more medium access control (MAC) control elements (MAC-CEs) to a base station requesting a modification of one or more data transmission timing parameters of one or more data elements associated with the first subscription based on the one or more base-band resource outage periods associated with the first subscription, wherein the one or more data elements comprise at least:
        a sounding reference signal (SRS) for an uplink, or
        a channel state information (CSI) reference signal (CSI-RS) for a downlink; and
    receiving one or more radio resource control (RRC) signals indicating that the one or more data transmission timing parameters of the one or more data elements are modified based on the modification of the one or more data transmission timing parameters requested in the one or more MAC-CEs.

2. The method of claim 1, wherein, upon the one or more data elements comprising at least the SRS for the uplink, the one or more data transmission timing parameters comprise at least an SRS-PeriodicityAndOffset value for avoiding a collision between the base-band resources utilized by the second subscription and the SRS for the uplink.

3. The method of claim 1, further comprising:
    transmitting, upon the one or more data elements comprising an SRS for the uplink, the SRS on the uplink according to the modification of the one or more data transmission timing parameters requested in the one or more MAC-CEs.

4. The method of claim 1, wherein identifying the one or more base-band resource outage periods associated with the first subscription based on the utilization of the at least partially shared base-band resources by the second subscription comprises:
    detecting, upon the one or more data elements comprising at least the SRS for the uplink, a collision between the base-band resources utilized by the second subscription and the SRS on the uplink.

5. The method of claim 1, wherein, upon the one or more data elements comprising at least the CSI-RS for the downlink, the one or more data transmission timing parameters comprise at least a CSI-ReportPeriodicityAndOffset value for avoiding a collision between the base-band resources utilized by the second subscription and the CSI-RS for the downlink.

6. The method of claim 1, further comprising:
receiving, upon the one or more data elements comprising at least the CSI-RS for the downlink, the CSI-RS on the downlink according to the modification of the one or more data transmission timing parameters requested in the one or more MAC-CEs.

7. The method of claim 1, wherein identifying the one or more base-band resource outage periods associated with the first subscription based on the utilization of the at least partially shared base-band resources by the second subscription comprises:
detecting, upon the one or more data elements comprising at least the CSI-RS for the downlink, a collision between the base-band resources utilized by the second subscription and the CSI-RS on the downlink.

8. A method for wireless communication at a base station, comprising:
receiving one or more medium access control (MAC) control elements (MAC-CEs) from a user equipment (UE) requesting a modification of one or more data transmission timing parameters associated with a first subscription based on one or more base-band resource outage periods associated with the first subscription;
scheduling a transmission of one or more data elements between the UE and the base station based on the modification of the one or more data transmission timing parameters requested in the one or more MAC-CEs, wherein the one or more data elements comprise at least:
a sounding reference signal (SRS) for an uplink, or
a channel state information (CSI) reference signal (CSI-RS) for a downlink; and
transmitting one or more radio resource control (RRC) signals indicating that the one or more data transmission timing parameters of the one or more data elements are scheduled based on the modification of the one or more data transmission timing parameters requested in the one or more MAC-CEs.

9. The method of claim 8, wherein, upon the one or more data elements comprising at least the SRS for the uplink, the one or more data transmission timing parameters comprise at least an SRS-PeriodicityAndOffset value for avoiding a collision between base-band resources utilized by a second subscription of the UE and the SRS for the uplink.

10. The method of claim 8, further comprising:
receiving, upon the one or more data elements comprising an SRS for the uplink, the SRS on the uplink according to the modification of the one or more data transmission timing parameters requested in the one or more MAC-CEs.

11. The method of claim 8, wherein, upon the one or more data elements comprising at least the CSI-RS for the downlink, the one or more data transmission timing parameters comprise at least a CSI-ReportPeriodicityAndOffset value for avoiding a collision between the base-band resources utilized by a second subscription of the UE and the CSI-RS for the downlink.

12. The method of claim 8, further comprising:
transmitting, upon the one or more data elements comprising at least the CSI-RS for the downlink, the CSI-RS on the downlink according to the modification of the one or more data transmission timing parameters requested in the one or more MAC-CEs.

13. A user equipment (UE) for wireless communication and having a first subscription and a second subscription, comprising:
a wireless transceiver;
a memory; and
a processor communicatively coupled to the wireless transceiver and the memory, wherein the processor and the memory are configured to:
identify one or more base-band resource outage periods associated with the first subscription based on a utilization of at least partially shared base-band resources by the second subscription,
transmit one or more medium access control (MAC) control elements (MAC-CEs) to a base station requesting a modification of one or more data transmission timing parameters of one or more data elements associated with the first subscription based on the one or more base-band resource outage periods associated with the first subscription, wherein the one or more data elements comprise at least:
a sounding reference signal (SRS) for an uplink, or
a channel state information (CSI) reference signal (CSI-RS) for a downlink, and
receive one or more radio resource control (RRC) signals indicating that the one or more data transmission timing parameters of the one or more data elements are modified based on the modification of the one or more data transmission timing parameters requested in the one or more MAC-CEs.

14. The UE of claim 13, wherein the processor and the memory are configured to:
transmit, upon the one or more data elements comprising an SRS for the uplink, the SRS on the uplink according to the modification of the one or more data transmission timing parameters requested in the one or more MAC-CEs.

15. The UE of claim 13, wherein the processor and the memory are configured to:
receive, upon the one or more data elements comprising at least the CSI-RS for the downlink, the CSI-RS on the downlink according to the modification of the one or more data transmission timing parameters requested in the one or more MAC-CEs.

16. The UE of claim 13, wherein, upon the one or more data elements comprising at least the SRS for the uplink, the one or more data transmission timing parameters comprise at least an SRS-PeriodicityAndOffset value for avoiding a collision between the base-band resources utilized by the second subscription and the SRS for the uplink.

17. The UE of claim 13, wherein to identify the one or more base-band resource outage periods associated with the first subscription based on the utilization of the at least partially shared base-band resources by the second subscription, the processor and the memory are configured to:
detect, upon the one or more data elements comprising at least the SRS for the uplink, a collision between the base-band resources utilized by the second subscription and the SRS on the uplink.

18. The UE of claim 13, wherein, upon the one or more data elements comprising at least the CSI-RS for the downlink, the one or more data transmission timing parameters comprise at least a CSI-ReportPeriodicityAndOffset value for avoiding a collision between the base-band resources utilized by the second subscription and the CSI-RS for the downlink.

19. The UE of claim 13, wherein to identify the one or more base-band resource outage periods associated with the first subscription based on the utilization of the at least partially shared base-band resources by the second subscription, the processor and the memory are configured to:

detect, upon the one or more data elements comprising at least the CSI-RS for the downlink, a collision between the base-band resources utilized by the second subscription and the CSI-RS on the downlink.

20. A base station, comprising:
    a wireless transceiver;
    a memory; and
    a processor communicatively coupled to the wireless transceiver and the memory, wherein the processor and the memory are configured to:
        receive one or more medium access control (MAC) control elements (MAC-CEs) from a user equipment (UE) requesting a modification of one or more data transmission timing parameters associated with a first subscription based on one or more base-band resource outage periods associated with the first subscription,
        schedule a transmission of one or more data elements between the UE and the base station based on the modification of the one or more data transmission timing parameters requested in the one or more MAC-CEs, wherein the one or more data elements comprise at least:
        a sounding reference signal (SRS) for an uplink, or
        a channel state information (CSI) reference signal (CSI-RS) for a downlink; and
    transmit one or more radio resource control (RRC) signals indicating that the one or more data transmission timing parameters of the one or more data elements are scheduled based on the modification of the one or more data transmission timing parameters requested in the one or more MAC-CEs.

21. The base station of claim 20, wherein, upon the one or more data elements comprising at least the SRS for the uplink, the one or more data transmission timing parameters comprise at least an SRS-PeriodicityAndOffset value for avoiding a collision between base-band resources utilized by a second subscription of the UE and the SRS for the uplink.

22. The base station of claim 20, wherein, upon the one or more data elements comprising at least the SRS for the uplink, the processor and the memory are configured to:
    receive the SRS on the uplink according to the modification of the one or more data transmission timing parameters requested in the one or more MAC-CEs.

23. The base station of claim 20, wherein, upon the one or more data elements comprising at least the CSI-RS for the downlink, the one or more data transmission timing parameters comprise at least a CSI-ReportPeriodicityAndOffset value for avoiding a collision between the base-band resources utilized by a second subscription of the UE and the CSI-RS for the downlink.

24. The base station of claim 20, wherein the processor and the memory are configured to:
    transmit, upon the one or more data elements comprising at least the CSI-RS for the downlink, the CSI-RS on the downlink according to the modification of the one or more data transmission timing parameters requested in the one or more MAC-CEs.

\* \* \* \* \*